(12) United States Patent
Taguchi

(10) Patent No.: US 9,276,439 B2
(45) Date of Patent: Mar. 1, 2016

(54) POWER SUPPLY SYSTEM, POWER TRANSMITTER, AND POWER RECEIVER

(71) Applicant: FUJITSU LIMITED, Kawasaki-shi, Kanagawa (JP)

(72) Inventor: Masakazu Taguchi, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 435 days.

(21) Appl. No.: 13/648,478

(22) Filed: Oct. 10, 2012

(65) Prior Publication Data
US 2013/0026851 A1 Jan. 31, 2013

Related U.S. Application Data

(63) Continuation of application No. PCT/JP2010/056562, filed on Apr. 13, 2010.

(51) Int. Cl.
H02J 17/00 (2006.01)
H02J 13/00 (2006.01)

(52) U.S. Cl.
CPC ............. *H02J 17/00* (2013.01); *H02J 13/0075* (2013.01); *Y02E 60/7853* (2013.01); *Y04S 40/126* (2013.01)

(58) Field of Classification Search
CPC ..... H02J 13/0075; H02J 17/00; Y04S 40/126; Y02E 60/7853
USPC .................. 307/98, 108, 109; 455/41.1, 41.2; 320/108, 109; 343/904
See application file for complete search history.

(56) References Cited

U.S. PATENT DOCUMENTS

2002/0158749 A1  10/2002  Ikeda et al.
2005/0055137 A1  3/2005  Andren et al.
(Continued)

FOREIGN PATENT DOCUMENTS

CN  1585953 A  2/2005
CN  1604437 A  4/2005
(Continued)

OTHER PUBLICATIONS

International Search Report for International Application No. PCT/JP2010/056562 dated Jul. 13, 2010.
(Continued)

*Primary Examiner* — Rexford Barnie
*Assistant Examiner* — Thai Tran
(74) *Attorney, Agent, or Firm* — Kratz, Quintos & Hanson, LLP

(57) ABSTRACT

A power supply system includes one or more power transmitters and one or more power receivers: the one or more transmitters transmitting identification information and a power transmitting condition to the one or more receivers, receiving identification information and a power receiving condition from the one or more receivers, wirelessly transmitting power to the one or more receivers on the basis of the power transmitting and receiving conditions, and generating power transmission amount information indicating the amount of the transmitted power; the one or more receivers receiving identification information and a power transmitting condition from the one or more transmitters, transmitting identification information and a power receiving condition to the one or more transmitters, wirelessly receiving power from the one or more transmitters on the basis of the power transmitting and receiving conditions, generating power reception amount information, and transmitting the identification information and the power reception amount information.

11 Claims, 25 Drawing Sheets

(56) References Cited

U.S. PATENT DOCUMENTS

| | | |
|---|---|---|
| 2005/0068009 A1 | 3/2005 | Aoki |
| 2006/0287763 A1* | 12/2006 | Ochi et al. .................... 700/231 |
| 2007/0068162 A1 | 3/2007 | Komura et al. |
| 2008/0122297 A1 | 5/2008 | Arai |
| 2008/0211320 A1* | 9/2008 | Cook et al. .................... 307/149 |
| 2008/0269953 A1 | 10/2008 | Steels et al. |
| 2009/0045773 A1* | 2/2009 | Pandya et al. ................. 320/108 |
| 2009/0102292 A1* | 4/2009 | Cook et al. .................... 307/104 |
| 2009/0106137 A1 | 4/2009 | Ochi |
| 2009/0243397 A1* | 10/2009 | Cook et al. .................... 307/104 |
| 2009/0271047 A1* | 10/2009 | Wakamatsu ................... 700/295 |
| 2009/0271048 A1* | 10/2009 | Wakamatsu ................... 700/296 |
| 2010/0045114 A1* | 2/2010 | Sample et al. ................. 307/104 |
| 2010/0079010 A1 | 4/2010 | Hyde et al. |
| 2010/0171368 A1* | 7/2010 | Schatz et al. .................. 307/104 |
| 2012/0112692 A1 | 5/2012 | Arai |

FOREIGN PATENT DOCUMENTS

| | | |
|---|---|---|
| CN | 1941536 A | 4/2007 |
| JP | H8-103039 | 4/1996 |
| JP | H8-237890 | 9/1996 |
| JP | 2005-168085 A1 | 6/2005 |
| JP | 2006-353042 A1 | 12/2006 |
| JP | 2008-154446 A1 | 7/2008 |
| JP | 2009-213295 A1 | 9/2009 |

OTHER PUBLICATIONS

First Office Action issued May 4, 2014 by The State Intellectual Property Office of the People's Republic of China in counterpart application No. 201080066098.0 with English translation.

Extended Search Report dated May 8, 2015 for corresponding European application No. 10849807.2.

* cited by examiner

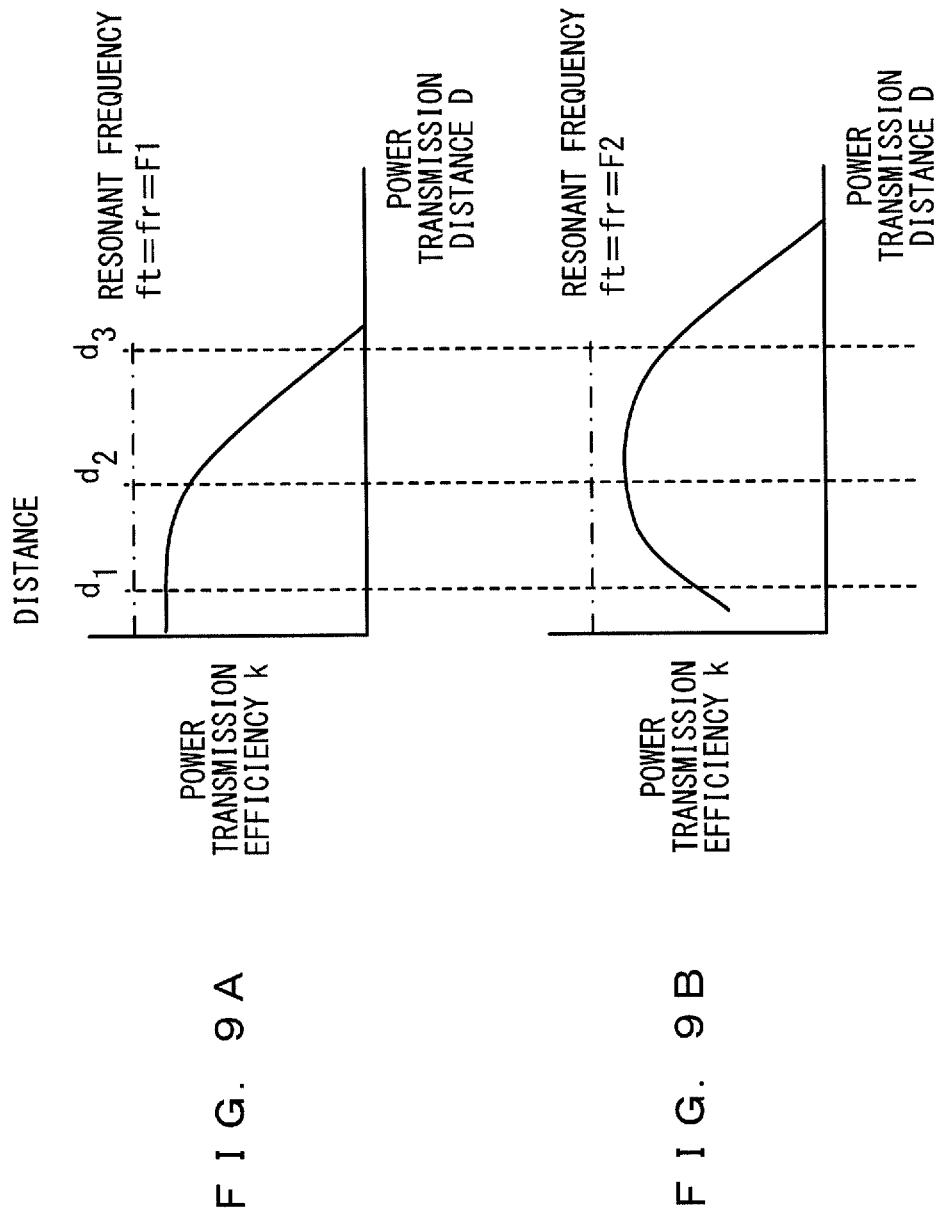

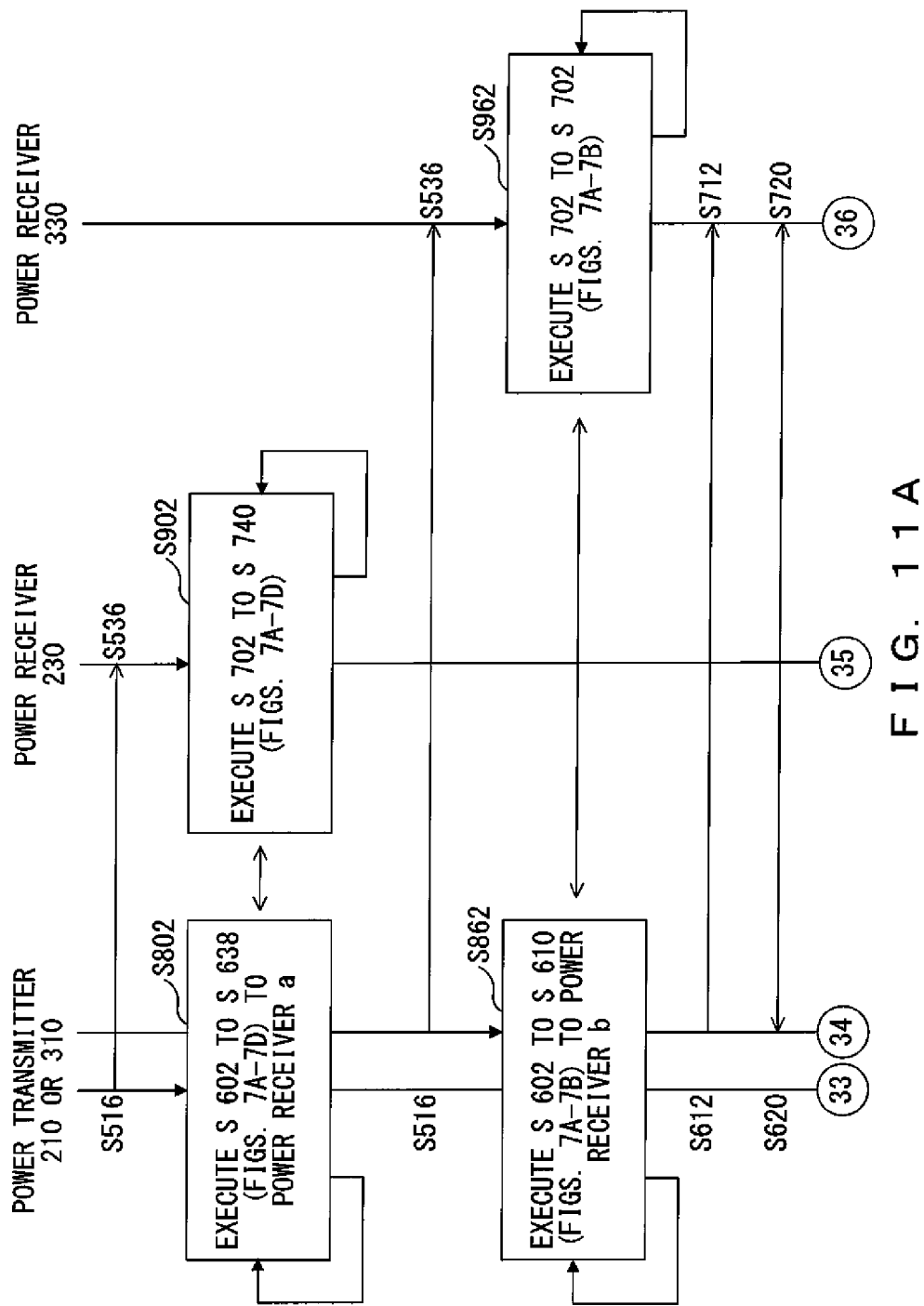
F I G. 11A

POWER SUPPLY SYSTEM, POWER TRANSMITTER, AND POWER RECEIVER

CROSS-REFERENCE TO RELATED APPLICATION

This application is a continuation application of International Application PCT/JP2010/056562 filed on Apr. 13, 2010, and designated the U.S., the entire contents of which are incorporated herein by reference.

FIELD

The present application relates to a power supply system, and in particular, it relates to the power supply system capable of wirelessly supplying power from a power transmitter to a power receiver.

BACKGROUND

Well-known wireless power supply technologies include power supplies based on electromagnetic induction and power supplies based on radio waves. On the other hand, recently, power supplies based on magnetic resonance have been proposed.

In a wireless power supply system based on magnetic resonance, for example, resonant coils having certain resonant frequencies are arranged in a power transmitting device, and resonant coils having the same resonant frequencies as those of the power transmitting device are arranged in a power receiving device. A coupling of a magnetic field which realizes an electromagnetic energy transfer by the magnetic resonance is formed between the power transmitting device and the power receiving device, and the power is efficiently transmitted wirelessly from the resonant coils of the power transmitting device to the resonant coils of the power receiving device by the coupling of a magnetic field.

It is considered that, compared with a power supply system based on radio waves, a power supply system based on magnetic resonance is capable of supplying a larger amount of power, elongating a power transmission distance, and reducing a size of the coil for power transmission.

A certain well-known non-contact power supply device embodies a power supply stand which includes a first coil, a power supply, power supply controlling equipment, and a supply commanding unit, and which is installed on the ground. A second coil, a charge controlling circuit, and a battery are loaded on a vehicle. In charging the battery, the vehicle is made to stop in such a way that the second coil is located immediately above the first coil, a controlling signal is output to the power supply from the power supply controlling equipment by an operation of the supply commanding unit, and an alternating excitation current is supplied to the first coil from the power supply, which generates an induced magnetic flux. An alternating induced electromotive force induced in the second coil by this induced magnetic flux is converted into a direct current by the charge controlling circuit, the obtained direct current is supplied to the battery, and the battery is thereby charged. A control displaying unit calculates and displays the supplied power amounts and charges or wirelessly transmits them.

In a certain well-known power supply system, an ECU (electronic control unit) of the vehicle which transmits power executes a program which includes a step of wirelessly transmitting power to the vehicle which receives power. The ECU of the vehicle which receives power, when it receives power transmitted from the vehicle which transmits power, supplies the received power to a driving motor, and executes a program which includes a step of driving a driving motor. With this, when the vehicle is traveling, power transmission and reception are available. The power supply system calculates fees on the basis of the transmitted power and/or received power.

A certain well-known power transmitting device senses an approach of a portable electronic apparatus having a high-speed large-capacity storage module which functions as a rechargeable power supply, and transmits power to charge the high-speed large-capacity storage module in response to the sensed approach. With this, the power source is rechargeable at a time of, for example, a noncontact authentication processing operation, by approximation to the authentication device. A charging system performs a charging fee process in accordance with an amount of charge.

Patent Document 1: Japanese Laid-open Patent Publication 8-237890
Patent Document 2: Japanese Laid-open Patent Publication 2005-168085
Patent Document 3: Japanese Laid-open Patent Publication 2006-353042

SUMMARY

The inventors have recognized a need for wirelessly transmitting power from the power transmitter to the power receiver on the basis of a predetermined power transmitting condition and a predetermined power receiving condition, for collecting information such as information of a power transmission amount in the power transmitter, a power reception amount in the power receiver, and the like, and for appropriately charging fees with respect to the power reception amount in the power receiver on the basis of the information.

An object of the embodiments of the present invention is to realize a wireless power transmission from the power transmitter to the power receiver on the basis of the power transmitting condition and the power receiving condition.

Another object of the embodiments is to be able to determine the fees charged on the basis of the power transmission amount and/or the power reception amount when a wireless power transmission is performed from the power transmitter to the power receiver.

Still another object of the embodiments is to be able to determine the fee to the power reception amount of each power receiver on the basis of the power transmission amount and/or the power reception amount when the wireless power transmission is performed from the power transmitter to a plurality of power receivers.

According to one aspect of the embodiment of the present invention, the power supply system includes at least one power transmitter, at least one power receiver, and an information processing device. The at least one power transmitter transmits first identification information and a power transmitting condition to a power receiver, receives second identification information and a power receiving condition from the power receiver, wirelessly transmits power to the power receiver on the basis of the power transmitting condition and the power receiving condition, and generates power transmission amount information which indicates a power amount wirelessly transmitted to the power receiver. The at least one power receiver receives the first identification information and the power transmitting condition from the corresponding power transmitter, transmits the second identification information and the power receiving condition to the corresponding power transmitter, wirelessly receives power from the corresponding power transmitter on the basis of the power transmitting condition and the power receiving condition, generates the power reception amount information which indicates the power amount wirelessly received, and transmits the first identification information, the second identification information, and the power reception amount information via a network. The information processing device manages the power transmission amount information and the power reception amount information via a wireless power feeding of a contractor, receives the first identification information, the second identification information, and the power transmission amount information via a network, and receives the second identification information and the power reception amount information via a network.

According to one aspect of the embodiments of the present invention, the wireless power transmission from the power transmitter to the power receiver on the basis of the power transmission and power receiving conditions may be realized, the fees may be determined on the basis of the power transmission amount and/or the power reception amount when the wireless power transmission is performed from the power transmitter to the power receiver, and the fees to the power reception amount of each power receiver on the basis of the power transmission amount and/or the power reception amount may be determined when the wireless power transmission is performed from a power transmitter to a plurality of power receivers.

BRIEF DESCRIPTION OF THE DRAWINGS

FIGS. 9A and 9B respectively illustrate one example of a change in the power transmission efficiency of different power transmitting resonant frequencies and of different power receiving resonant frequencies to the power transmission distance D.

FIGS. 11A and 11B illustrate another example of a power transmission procedure when transmitting power to two power receivers which simultaneously receives power from one power transmitter, in accordance with the procedures of FIGS. 7A-7D, in FIG. 1A-1B or 2A-2B.

DESCRIPTION OF EMBODIMENTS

Figure 1A:
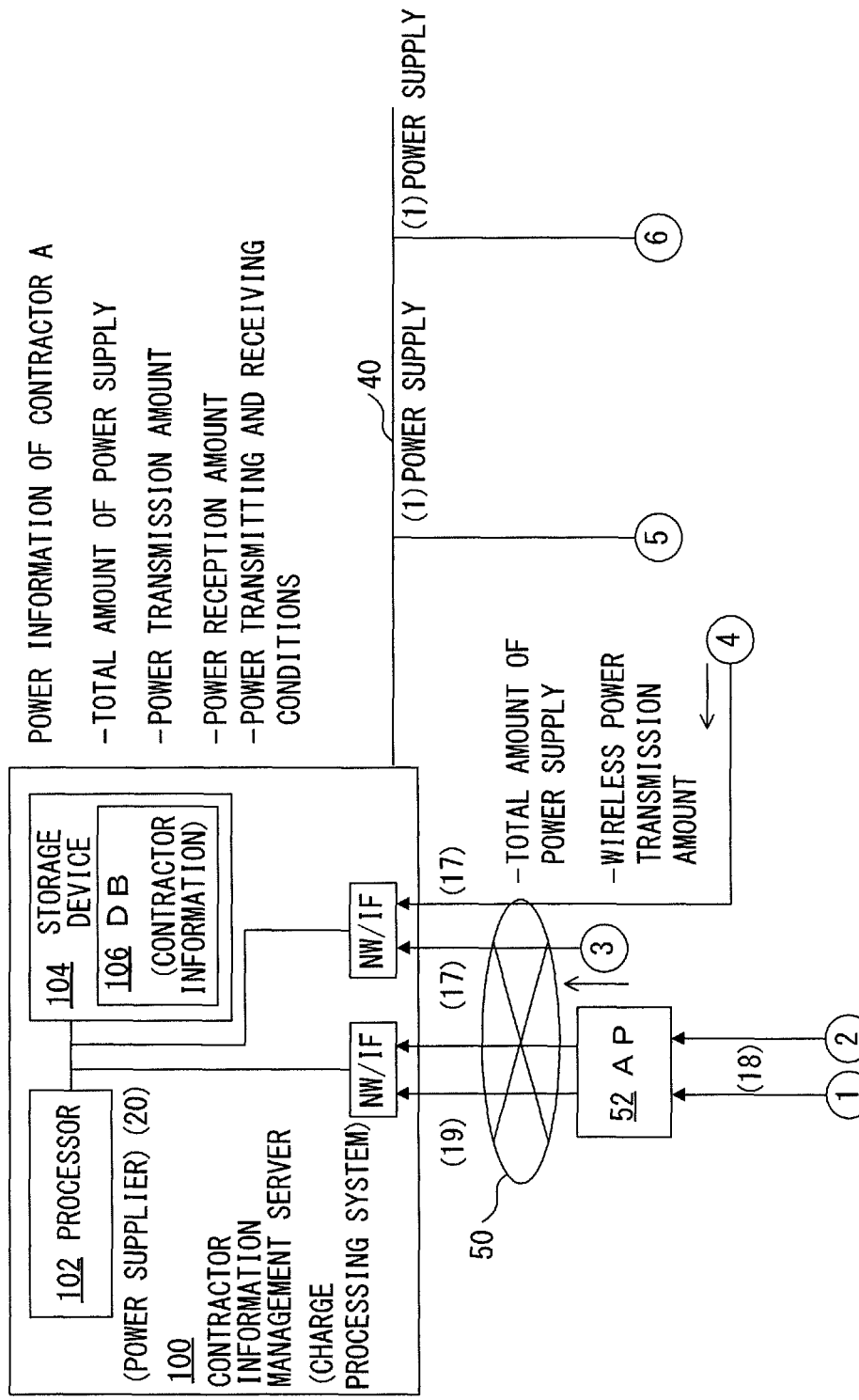
FIGS. 1A and 1B illustrate one example of a schematic configuration of the power supply system for wireless power supply and charging fees according to one embodiment.

The object and the advantages of the invention will be realized and attained by means of the elements and combinations particularly pointed out in the claims.

It is to be understood that both the foregoing general description and the following detailed description are exemplary and explanatory and are not restrictive of the invention.

The nonrestrictive embodiments of the present invention are explained referring to drawings. In the drawings, the same components and elements are allotted the same reference numerals.

Figure 1B:
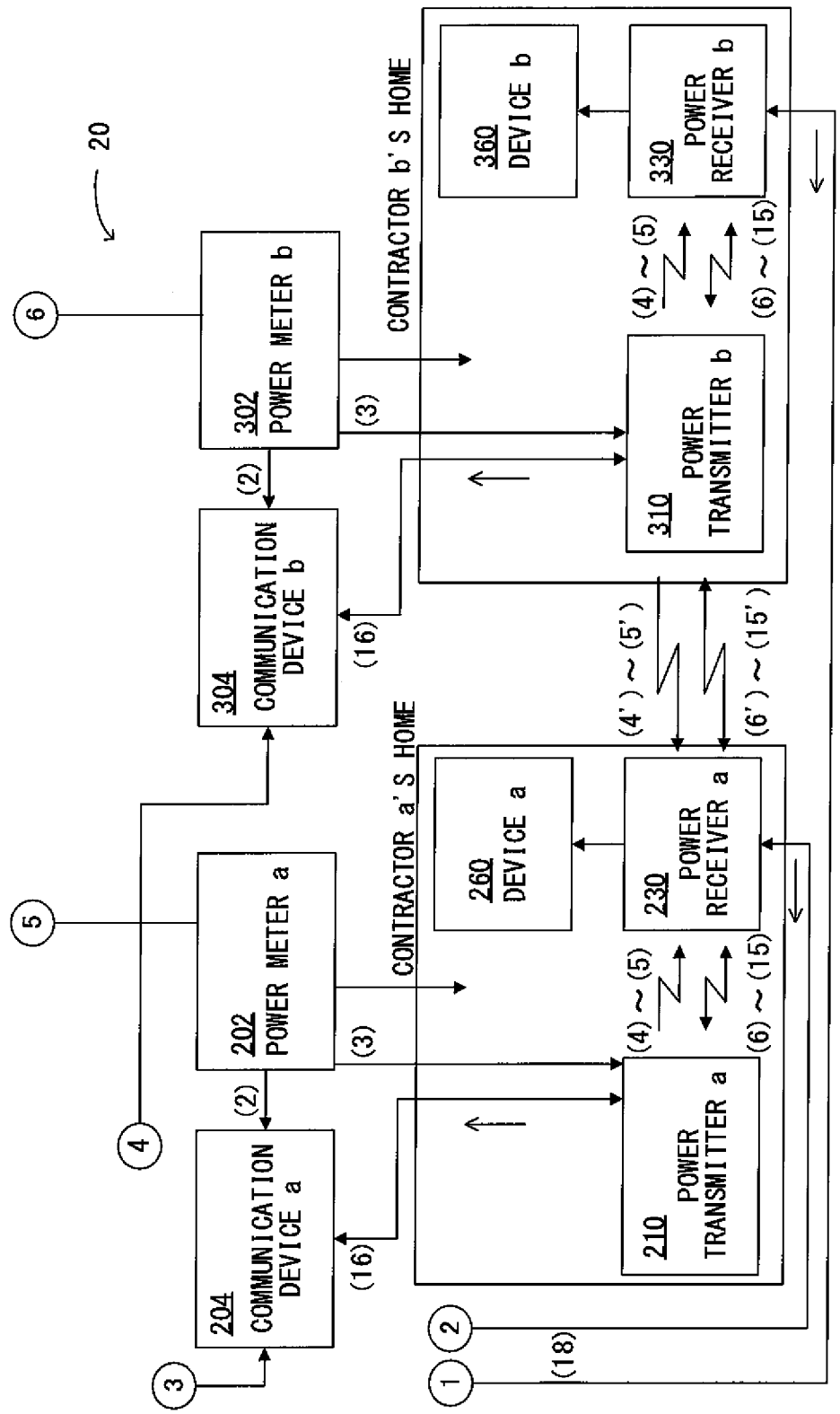

FIGS. 1A-1B illustrate one example of a schematic configuration of a power supply system 20 for a wireless power supply and charging fees according to one embodiment.

Figure 2A:
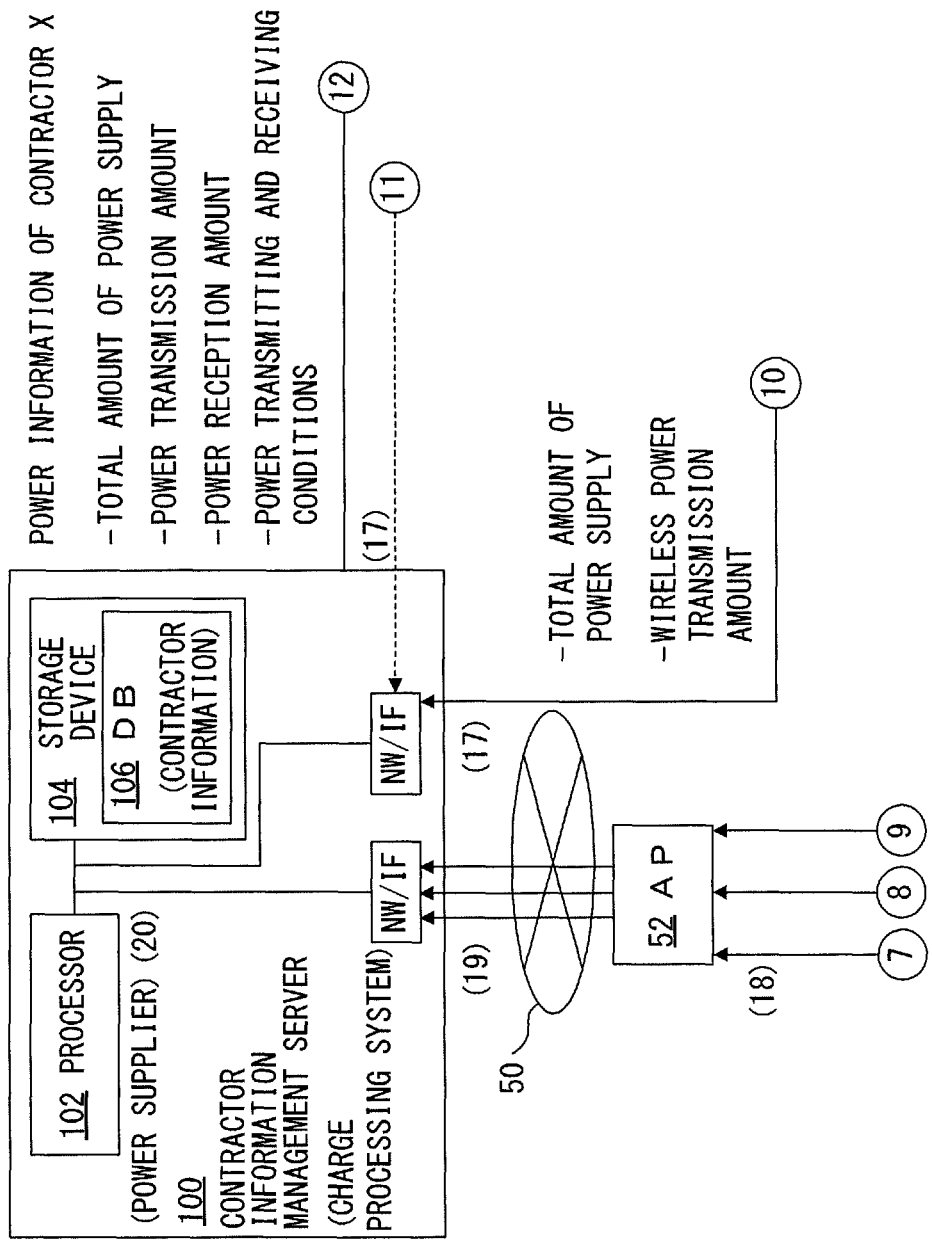
FIGS. 2A and 2B illustrate another example of a schematic configuration of the power supply system for wireless power supply and charging fees according to another embodiment.
Figure 2B:
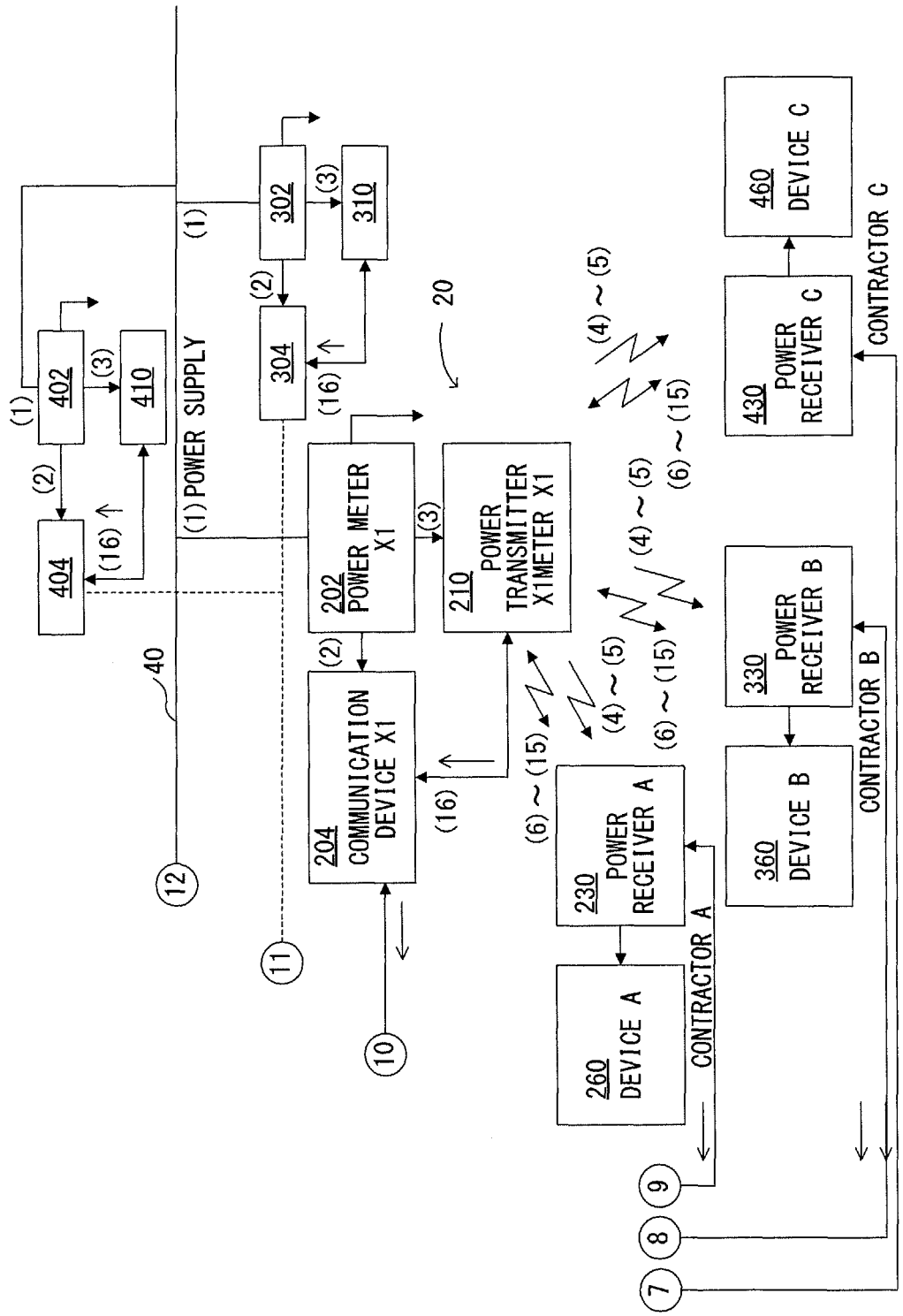

FIGS. 2A-2B illustrate an example of a schematic configuration of another power supply system 22 for a wireless power supply and charging fees according to another embodiment.

In FIGS. 1A and 1B, the power supply system 20 includes a contractor information management server 100 of power suppliers, e.g., electric power companies, power meters 202 and 302 provided in the power supplying facilities or homes of each of the contractors a and b with respect to power use, communication devices 204, 304 and power transmitters 210 and 310. In FIGS. 1A and 1B, the letters a and b represent each of the contractors with respect to power use related to the power meters 202 and 302, power transmitters 210 and 310, or power receivers 230 and 330. Power contractors or power consumers a and b are capable of transmitting power from the power transmitters 210 and 310 to the power receivers 230 and 330 in the power supplying facilities or homes by a wireless power supply system. The power receivers 230 and 330 are capable of receiving power from the power transmitter 310 by a wireless power supply system at different time periods or in parallel simultaneously. The power transmitters 210 and 310 are capable of transmitting power to the power receivers 230 and 330 by a wireless power supply system at different time periods or in parallel simultaneously.

The contractor information management server 100 is an information processing device and includes a processor 102, a storage device 104 which stores a database (DB) 106, and a network interface (NW/IF). The processor 102 executes processing for realizing a function of a charging fee processing system in accordance with a program stored in the storage device 104.

The power receivers 230 and 330 are capable of supplying power to devices 260 and 360, which are coupled thereto, respectively. The devices 260 and 360 may include a charging circuit and a rechargeable battery. The devices 260 and 360 may be home electrical appliances such as, for example, a television device, an audio device, a radio, a refrigerator, an air-conditioner, a washing machine, an iron, a facsimile machine, or a telephone set. In addition, the devices 260 and 360 may be information equipment such as, for example, a PHS telephone, a cordless handset, a portable wireless transceiver, a portable personal computer, a hand-held personal computer, a palm size personal computer, a portable information terminal, a PDA, a hand-held gaming device, and the like. Further, the devices 260 and 360 may be an electric automobile or an electric motorcycle.

In FIGS. 1A and 1B, a power supplier of the contractor information management server 100 transmits power from an electric generation plant by a transmission line 40, and supplies power to the line of the power supply facilities in the home of each of the contractors a and b via the power meters 202 and 302 connected to the transmission line 40 (1). The power meters 202 and 302 periodically or regularly supply the measured total power supply amount or meter values to the communication devices 204 and 304 (2). On the other hand, power is supplied from the power meters 202 and 302 to the power transmitters 210 and 310, or other electric appliances, via the line of the power supplying facility of the contractors a and b (3).

The power transmitters 210 and 310 exchange information concerning the identification information (ID) of each of the contractors a and b, and of the power receivers 230 and 330, the power transmitting condition, the power receiving condition, and the like by a wireless communication between the power receivers 230 and 330 (4 to 8). Subsequently, the power transmitters 210 and 310 transmit power by a wireless power supply system to the power receivers 230 and 330 on the basis of the power transmitting condition and the power receiving condition between the power receivers 230 and 330, while transmitting, receiving, and monitoring the power transmitting state and the power receiving state wirelessly (4 to 15). The wireless communication between the power transmitters 210 and 310, and the power receivers 230 and 330, may comply with a near field wireless communication standard such as a blue tooth standard (IEEE208.11a/b/c) or a wireless LAN standard (IEEE802.15).

Further, the power receiver 230 of the contractor a may exchange identification information (ID) and information of the power transmitting condition and the power receiving condition wirelessly between the power transmitter 310 of other contractor b, and may receive power from the power transmitter 310 by a wireless power supply system, while transmitting, receiving, and monitoring the power transmission and reception states wirelessly (4' to 15'). The power transmission by the power transmitters 210 and 310 to the power receiver 230 may be performed in parallel simultaneously during a certain time period. Further, the power reception from the power transmitter 310 by the power receivers 230 and 330 may be performed in parallel simultaneously during a certain time period.

The power transmitters 210 and 310, when the power transmission is completed, supply the power transmission information to the communication devices 204 and 304 (16). The power transmission information includes, for example, identification information of the contractors a and b of the power transmitters 210 and 310, the identification information of the contractors a and b of the power receivers 230 and 330, a start-up time and a completion time of the power transmission, a start-up time and a completion time of the simultaneous power transmission, the applied power transmitting condition and the applied power receiving condition in each time period, the power transmission state and the power reception state, and information of the power transmission amount (data). The power transmission information may include information of the power reception amount (data) in the power receivers 230 and 330. The communication devices 204 and 304 store the identification information of the contractors a and b of the power meters 202 and 302, a total power supply amount or a meter value, the power transmission information of the power transmitters 210 and 310, and the like in the memory (not illustrated). The communication devices 204 and 304 transmit the identification information of the contractors a and b, a total power supply amount, the power transmission information, and the like, to the contractor information management server 100 of the power supplier via a network 50 (17).

On the other hand, the power receivers 230 and 330, when the power reception is completed, transmit the power reception information to the contractor information management server 100 of the power supplier via a wireless base station (AP) 52 on, for example, a wireless communication channel of a mobile communication network (18). The power reception information includes, for example, the identification information of the contractors a and b of the power receivers 230 and 330, the identification information of the contractors a and b of the power transmitters 210 and 310, the start-up time and completion time of the power reception, the start-up time and completion time of the simultaneous power reception, the applied power transmitting condition and power receiving condition in each time period, the power transmission and power reception states, the power reception amount, and the like. The mobile communication network may comply with standards such as, for example, a PHS (Personal Handy-phone System), a PDC (Personal Digital Cellular) for the $2^{nd}$-generation mobile phone communication, an IS-95B (CdmaOne) for the $2.5^{th}$-generation mobile phone communication, an IMT2000(HSDPA (High Speed Downlink Packet Access)) for the $3^{rd}$-generation mobile phone communication, and the like. The wireless base station 52 transmits the power reception information to the contractor information management server 100 via a network 50 which includes, for example, a public switched telephone network (PSTN) and/or a packet switched data network (PSDN), an ISDN (Integrated Services Digital Network) or an Internet, and the like (19). The network 50 which transmits the power reception information, however, may be a network which is different from the network 50 which transmits the power transmission information.

The contractor information management server 100 calculates the fees of the power for the power amount received by the power receivers 230 and 330 on the basis of the received identification information of the contractors a and b, the power transmission and reception information, the contract information of the contractors a and b of the data base 106, and charges the fees to the contractors a and b (20).

In FIG. 2, the power supply system 22 includes the contractor information management server 100 of power suppliers, power meters 202, 302, and 402, communication devices 204, 304, and 404, and power transmitters 210, 310, and 410, provided in power supplying facilities or homes of each contractor. In FIG. 2, letters x1 represent contractors with respect to power use related to the power meters 202, 302, and 402, or power transmitters 210, 310, and 410, and the letters a, b, and c represent each contractor with respect to power use related to the power receivers 230, 330, and 430. The power contractors or power consumers a, b, and c related to the power reception, in the power supply facility which may be shared for the contractor x1 related to the power transmission, are capable of receiving power from the power transmitters, respectively by the power receivers 230, 330, and 430 by a wireless power supply system in the respective different time periods or in parallel simultaneously. In addition, the power transmitters 210, 310, and 410 may transmit power to any of the power receivers 230, 330, and 430 by a wireless power supply system in the respective different time periods or in parallel simultaneously.

The power transmitter 210, for example, exchanges between the power receivers 230, 330, and 430 the identification information (ID) of the contractors x1, a, b, and c, and the information of the power transmitting condition and the power receiving condition, and the like, by a wireless communication (4 to 8). Subsequently, the power transmitter 210 transmits power by a wireless power supply system to the power receivers 230, 330, and 430 on the basis of the power transmitting condition and the power receiving condition, while transmitting and receiving, and monitoring, the power transmission and power reception states between the power receivers 230, 330, and 430 (9 to 15).

The power transmitter 210, after the power transmission is completed, supplies the power transmission information to the communication device 204 (16). The power transmission information includes, for example, the identification information of the contractor x1 of the power transmitter 210, the identification information of the contractors a, b, and c of the power receivers 230, 330, and 430, information of a start-up time and completion time for the power transmission, information of a start-up time and a completion time of the simultaneous power reception by a plurality of power receivers in response to the power transmission, information of the applied power transmitting condition and applied power receiving condition in each time period, information of the power transmission and power reception states, and information of the power reception amount. The power transmission information may include information of the power reception amount in the power receivers 230, 330, and 430, and information of a start-up time and a completion time of the simultaneous power transmission by a plurality of power transmitters. The communication device 204 stores the identification information of the contractor x1, the total amount of the power supply or the meter values, the power transmission information, and the like in the memory (not illustrated). The communication device 204 transmits the identification information of the contractor x1, the total amount of the power supplied, the power transmission information, and the like to the contractor information management server 100 of the power suppliers via a network 50 (17).

On the other hand, the power receivers 230, 330, and 430, after the power reception is completed, transmit the power reception information to the contractor information management server 100 via the wireless base station (AP) 52, for example, on a wireless communication line of the mobile communication network or on a channel (18). The power reception information includes, for example, the identification information of the contractor x1 of the power transmitter 210, the identification information of the contractors a, b, and c of the power receivers 230, 330, and 430, a start-up time and a completion time for the power reception, a start-up time and a completion time of the simultaneous power transmission by a plurality of the power transmitters, the power transmitting condition and the power receiving condition in each time period, the power transmission and the power reception states, and the power reception amount, and the like. The wireless base station 52 transmits the power reception information to the contractor information management server 100 via a network 50 (19). The network 50 which transmits the received power information, however, may be a different network from the network 50 which transmits the power transmission information. The other operations and procedures of the system 22 in FIGS. 2A-2B are the same as those of the system 20 in FIGS. 1A and 1B.

Figure 3:
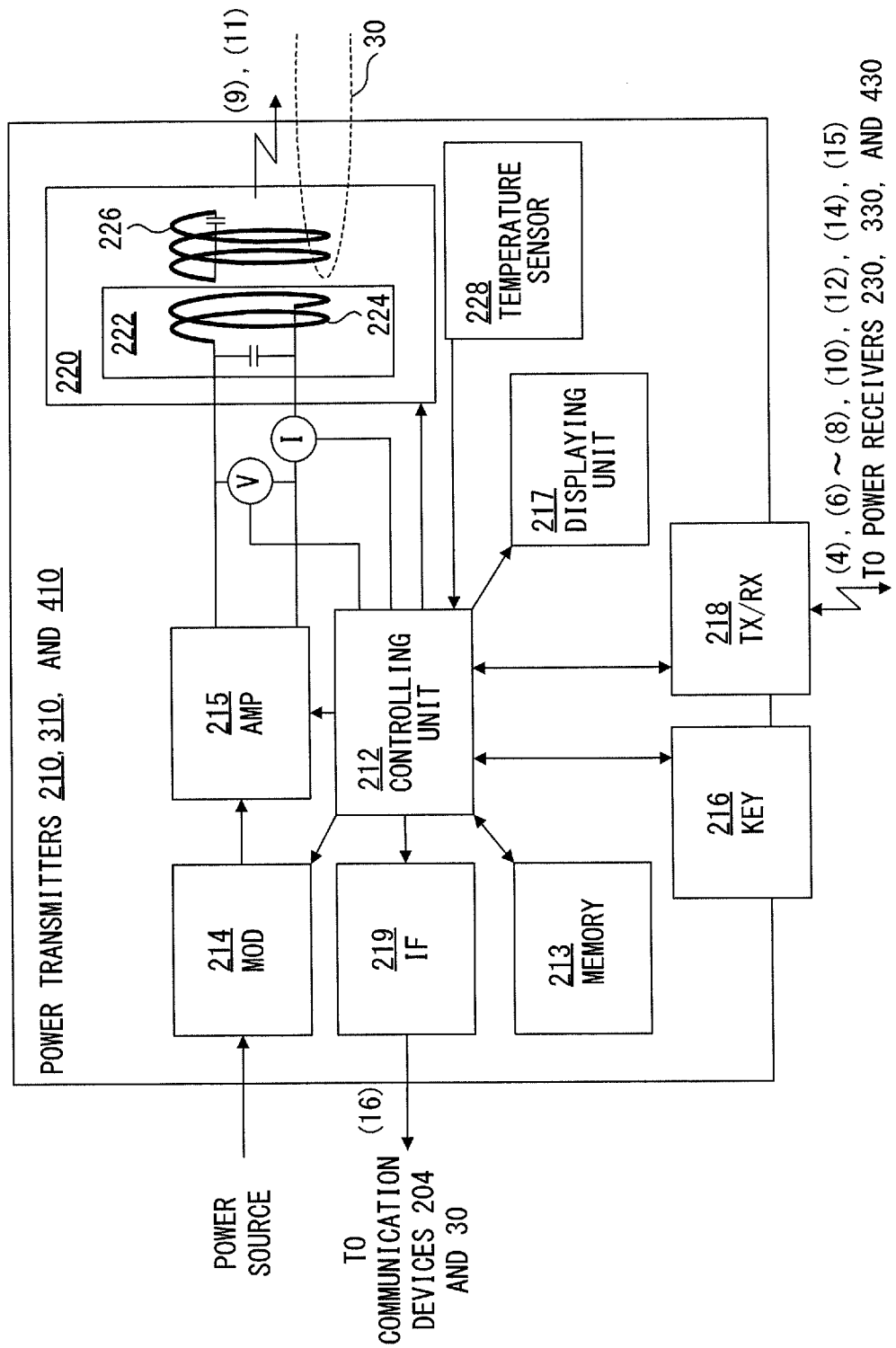
FIG. 3 illustrates one example of a schematic configuration of each power transmitter of FIGS. 1A-1B and 2A-2B.

FIG. 3 illustrates an example of the schematic configuration of the respective power transmitters 210, 310, and 410 in FIGS. 1A-1B and 2A-2B.

Each of the power transmitters 210, 310, and 410 includes a controlling unit 212, a memory or a storage unit 213, a modulating unit or oscillating unit (MOD) 214, an amplifier 215, a power transmitting unit 220, and a temperature sensor 228. Each of the power transmitters 210, 310, and 410 further includes an operation key 216, a displaying unit 217, a transceiver (TX/RX) 218 for a near field wireless communication, and an interface (I/F) 219. The controlling unit 212 is connected to the elements 213 to 220, and 228, supplies control signals to the elements 213 to 220, and 228, and transmits and receives information and data between the elements 213 to 220, and 228. The controlling unit 212 may be a processor for exclusive use, or a processor such as a microprocessor or a microcomputer which operates with the program stored in the memory 213.

A power transmitting unit 220 includes a power supplying unit or a circuit 222 for power transmission, and a power transmitting resonant coil 226. The power supplying unit 222 in the power transmitting unit 220 is connected to a modulating unit 214 via an amplifier 215, and preferably includes a power supplying coil or an electromagnetic induction coil 224. The modulating unit 214 is connected to a DC power source or an AC power source coupled to an electrical interconnection of the power supplying facilities of contractors a, b, and x1.

The transceiver 218 is a transceiver which complies with a near field wireless communication standard such as a blue tooth standard or a wireless LAN standard, and wirelessly communicates with the power receivers 230, 330, and 430. The interface 219 forms an interface between the communication devices 204 and 304.

The memory 213 stores the power transmission information of the identification information of the contractors a, b, and x1 of the power transmitters 210, 310, and 410, the identification information of the power transmitters 210, 310, and 410, the identification information of the contractors a, b, and c of the power receivers 230, 330, and 430, and the identification information of the power receivers 230, 330, and 430. In addition, the memory 213 is capable of storing such power transmission information as a start-up time and a completion time of the power transmission, a start-up time and a completion time of the simultaneous power reception by a plurality of the power receivers in response to the power transmission, the power transmitting condition and the power receiving condition in each time period, the power transmission and power reception states, the power transmission amount, the power reception amount, and the like, and other information. The communication devices 204, 304, and 404 are capable of acquiring the identification information of the contractors a, b, and x1, and the identification information of the power transmitters 210, 310, and 410 from the power meters 202 and 302, the power transmitters 210, 310, and 410 (a memory 213), and/or their own memory.

The controlling unit 212 detects a presence and an absence of the power receivers 230, 330, or 430, and authenticates them by regularly transmitting inquiry signals and by receiving the responses via the transceiver 218. The controlling unit 212 further transmits and receives the power transmitting condition and the power receiving condition between the power receivers 230, 330, and 430 via the transceiver 218, and on the basis of the power transmitting condition and the power receiving condition, controls the modulating unit 214, the amplifier 215, and the power transmitting unit 220 in such a way as to transmit power by a wireless power transmission system to the power receivers 230, 330, and 430.

The controlling unit 212 periodically acquires a temperature of the temperature sensor 228 which detects the temperature of the power transmitting resonant coil 226 and judges whether or not the temperature exceeds a threshold value, or in other words, the controlling unit 212 judges whether the temperature is normal or abnormal. When the temperature indicates an abnormality via an exceeded threshold value, the controlling unit 212 may judge that it needs to stop power transmission; it may raise an alert by the displaying unit 217 and stopping the operations of the modulating unit 214, the amplifier 215, and the power transmitting unit 220. The temperature sensor 228 may be, for example, a temperature detector which uses thermocouple and voltage measurement.

The displaying unit 217 includes a display and/or a speaker. The controlling unit 22 displays a power supply state of the power transmitting resonant coil 226 visibly or audibly to the displaying unit 217. The power supply state may be, for example, during the authentication in the controlling unit 22, during the establishment of communication of the transceiver 218, the establishment of communication, the preparation completed state of the power transmission by the power transmitting unit 220, non-power transmitting state, power transmitting state, abnormality, alert, normality, or the completion of power transmission.

The controlling unit 212 detects the power voltage and current supplied to the power transmitting unit 220 using a voltmeter (V) and an ammeter (I) connected to the power transmitting unit 220 and measures the power, obtains the power amount by integrating the power with respect to time, and stores it in the memory 213. The controlling unit 212 supplies the power transmission information to the communication devices 204 and 304 via the interface 219.

Figure 4:
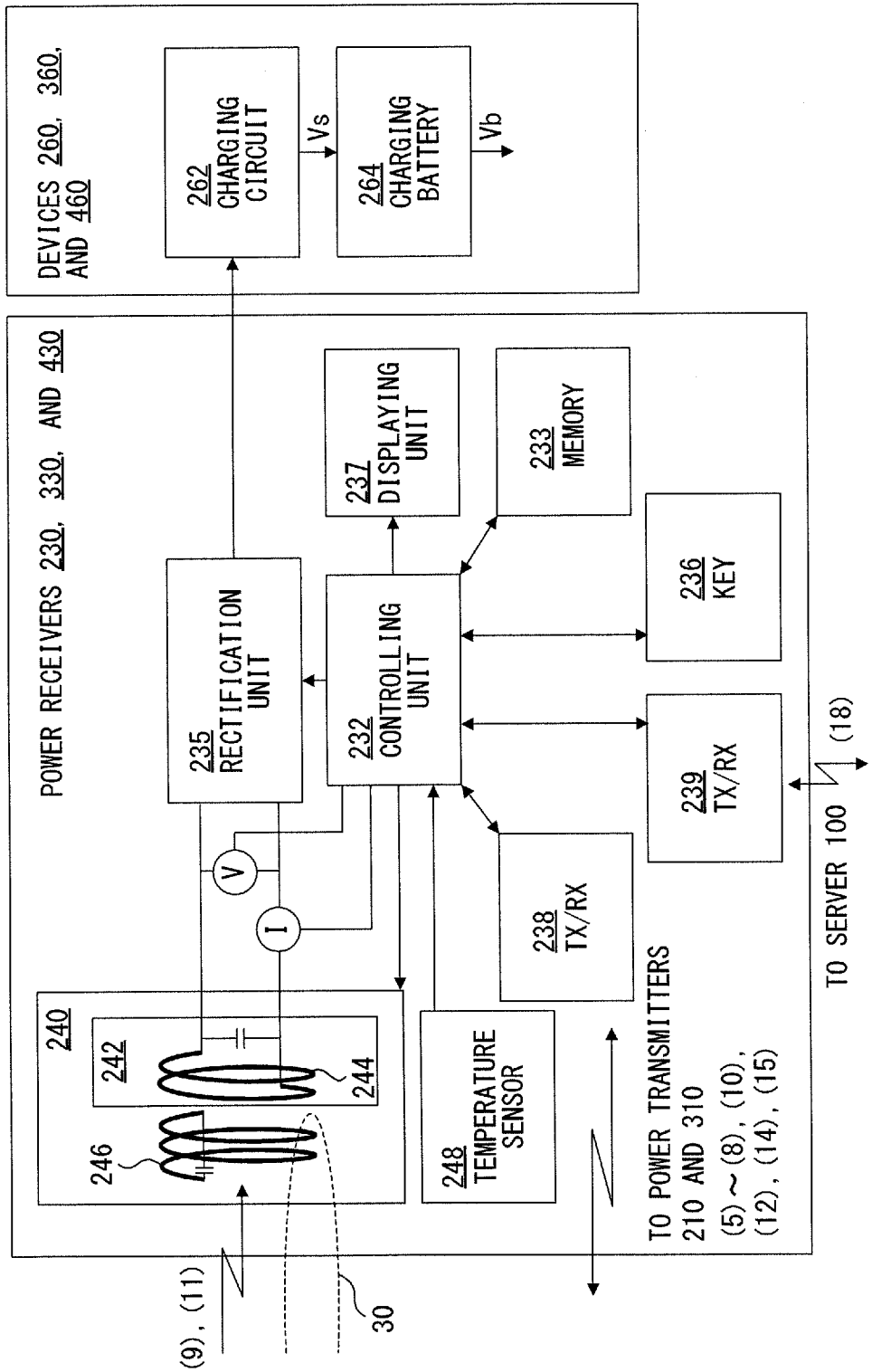
FIG. 4 illustrates one example of a schematic configuration of each power receiver of FIGS. 1A-1B and 2A-2B.

FIG. 4 illustrates an example of the schematic configuration of the respective power receivers 230, 330, and 430 in FIGS. 1A-1B and 2A-2B.

Each of the power receivers 230, 330, and 430 includes a controlling unit 232, a memory or a storage unit 233, a rectification unit 235, a power receiving unit 240, and a temperature sensor 248. Each of the power receivers 230, 330, and 430 further includes an operation key 236, a displaying unit 237, a transceiver (TX/RX) 238 for a near field wireless communication, a transceiver (TX/RX) 239 for a mobile communication, and a power receiving unit 240. The controlling unit 232 is connected to the elements 233 to 240, supplies signals to the elements 233 to 240, and transmits and receives information and data between the elements 233 to 240. The controlling unit 232 may be a processor for exclusive use, or a processor such as a microprocessor or a microcomputer which operates with the program stored in the memory 233.

A power receiving unit 240 includes a power receiving resonant coil 246 and a power fetching unit or a circuit 242 for fetching power. In the power receiving unit 240, the power fetching unit 242 preferably includes a power fetching coil or an electromagnetic induction coil for fetching power from the power receiving resonant coil 246, and supplies the power fetched from the power receiving resonant coil 246 to the rectification unit 235 as an alternating current. The rectification unit 235 may include a rectifier and a smoother. The rectification unit 235 is connected to the devices 260, 360, or 460 which use or consume power.

The devices 260, 360, or 460 include an electric circuit for realizing each function, and further, the devices 260, 360, or 460 may include a charging circuit 262 and a charging battery 264. The rectification unit 235 is connected to the charging circuit 262 and/or the electric circuit of the devices 260, 360, or 460. The charging circuit 262 supplies a DC voltage to the charging battery 264. The charging battery 264 supplies the DC voltage to the electric circuit.

The transceiver 218 is a transceiver which complies with a near field wireless communication standard such as a blue tooth standard or a wireless LAN standard, and wirelessly communicates with the power transmitters 210, 310, and 410. The transceiver 239 wirelessly communicates with the wireless base station 52.

The memory 313 stores the power transmission information of the identification information of the contractors a, b, and c of the power receivers 230, 330, and 430, the identification information of the power receivers 230, 330, and 430, the identification information of the contractors a, b, and x1 of the power transmitters 210, 310, and 410, and the identification information of the power transmitters 210, 310, and 410. In addition, the memory 313 is capable of storing such power transmission information as a start-up time and a completion time of the power transmission, a start-up time and a completion time of the simultaneous power reception by a plurality of the power receivers, the power transmitting condition and the power receiving condition in each time period, the power transmission and power reception states, the power transmission amount, the power reception amount, and the like, and other information.

The controlling unit 232 receives inquiry signals which include identification information from the power transmitters 210, 310, or 410 via the transceiver 238, and transmits a response which includes the identification information of the power receivers 230, 330, and 430 to the power transmitters 210, 310, and 410, and authenticates them. The controlling unit 232 transmits and receives the power transmitting condition and the power receiving condition with the power transmitters 210, 310, and 410 via the transceiver 238, and on the basis of the power transmitting condition and the power receiving condition, controls the power receiving unit 240 and the rectification unit 235 in such a way as to receive power from the power transmitters 210 and 310 in a wireless power transmission system.

The controlling unit 232 periodically acquires a temperature of the temperature sensor 248 which detects the temperature of the power receiving resonant coil 246 and judges whether or not the temperature exceeds a threshold value, or in other words, the controlling unit 232 judges whether the temperature is normal or abnormal. When the temperature indicates an abnormality via an exceeded threshold value, the controlling unit 232 may judge that it needs to stop power transmission, and it may raise an alert with the displaying unit 237 and stop the operations of the rectification unit 235 and the power receiving unit 240. The temperature sensor 248 may be, for example, a temperature detector which uses thermocouple and voltage measurement.

The displaying unit 237 includes a display and/or a speaker. The controlling unit 232 displays a power supply state of the power receiving resonant coil 246 visibly or audibly to the displaying unit 237. The power supply state may be, for example, the preparation completed state of the reception by the transceiver 238, in the middle of establishment of the communication, after the establishment of the communication, the preparation completed stated of the power reception by the power receiving unit 240, a non-power receiving state, a power receiving state, or a state of abnormality, alert, normality, or the completion of power reception.

The controlling unit 232 detects the power voltage (V) and current (I) supplied from the power receiving unit 240 using a voltmeter (V) and an ammeter (I) connected to the power receiving unit 240 and measures the power, obtains the power amount by integrating the power with respect to time, and stores it in the memory 233. The controlling unit 232 supplies the power reception information to the transceiver 239. The transceiver 239 transmits the power reception information to the contractor information management server 100 via a wireless base station (AP) 52 on a wireless communication line or a channel.

In FIGS. 3 and 4, a magnetic field coupling via a magnetic resonance or a coupled magnetic field 30 is formed between the power transmitting resonant coil 226 and the power receiving resonant coil 246 in a predetermined distance range. The resonant frequency ft of the power transmitting resonant coil 226 and the resonant frequency fr of the power receiving resonant coil 246 are the same or substantially the same. The power transmitting resonant coil 226 is capable of transmitting electromagnetic energy or power to the power receiving resonant coil 246 by a coupling of the magnetic resonance. The coupling of the magnetic resonance is more effective even when the distance between the power transmitting resonant coil 226 and the power receiving resonant coil 246 is longer than the distance which generates electromagnetic induction.

The range in which the resonant frequencies ft and fr are substantially the same may be within a frequency range to achieve a higher transmission efficiency than electromagnetic induction, and for example, it may be within a frequency range in which a Q value of a resonance point becomes half the value of the maximum value.

The power transmitting resonant coil 226 may be, for example, a helical type coil with a diameter of 5 to 20 cm formed of copper. The power receiving resonant coil 246 may be, for example, a helical type coil in which a wound shape with a maximum diameter of 1 to 4 cm formed of copper is circular, oblong, or quadrangular (rectangular). The distance between the power transmitting resonant coil 226 and the power receiving resonant coil 246 may be, for example, 2 to 40 cm. The resonant frequencies ft and fr may be, for example, 5 to 20 MHz.

The power transmitting resonant coil 226 and the power receiving resonant coil 246 are each formed, for example, of one coil and have an inductance L and a capacitance C which satisfies a resonance condition. The capacitance C may be formed of a floating capacitance of the power transmitting resonant coil 226 or the power receiving resonant coil 246. The capacitance C may be adjusted by the capacitance of a capacitor which is coupled to the power transmitting resonant coil 226 or the power receiving resonant coil 246. The resonant frequency ft of the power transmitting resonant coil 226 and the resonant frequency fr of the power receiving resonant coil 246 may be selected or changed by adjusting the inductance L and the capacitance C.

A respective impedance Z of the power transmitting resonant coil 226 and the power receiving resonant coil 246 is represented by the following formula.

$$Z = R + i(\omega L - 1/\omega C)$$

Here, R represents a combined resistance of an internal resistance of the power transmitting resonant coil 226 or the power receiving resonant coil 246 and/or an internal resistance of the capacitor, and ω represents an angular frequency or an angular speed.

A respective LC resonant frequency f (Hz)=ω/2π of the power transmitting resonant coil 226 and the power receiving resonant coil 246 is represented by the following formula.

$$f = 1/(2\pi(LC)^{1/2})$$

In order to increase the Q value (=1/R×((L/C)$^{1/2}$), the power supplying unit 222 may be configured not to be directly connected to the power transmitting resonant coil 226. The Q value, which represents sharpness of the resonance, is determined by the resistance of the coil and of the capacitor and the radiation resistance, and the smaller combined resistance value R of these resistances has a larger Q value.

When the power transmitting resonant coil 226 and the power receiving resonant coil 246 which satisfy the resonance condition (ft=fr) are approximated, the power receiving resonant coil 246 resonates in the magnetic field 30 formed by the power transmitting resonant coil 226 and generates an alternating current.

In the power transmitting unit 220, the modulating unit 214 and the amplifier 215 supply power to the power supplying coil 224. The modulating unit 214 and the amplifier 215 supply power either directly or indirectly to the power supplying coil 224 with, for example, a resonant frequency ft for magnetic resonance. The frequency of the modulating unit 214 may be different from the resonant frequency ft of the power transmitting resonant coil 226.

The power supplying coil 224 may supply power supplied from the modulating unit 214 and the amplifier 215 to the power transmitting resonant coil 226 by the electromagnetic induction. In this case, the power transmitting resonant coil 226 and the power supplying coil 224 are located at a sufficiently short distance as to be capable of supplying power via the electromagnetic induction, and the resonant frequency of the power supplying coil 224 need not be considered.

In this way, power is efficiently supplied to the power receiving resonant coil 246 by the electromagnetic resonance via the power transmitting resonant coil 226.

In the power receivers 230, 330, and 430, the power receiving resonant coil 246 receives power from the power transmitting resonant coil 226 via the magnetic field coupling by the magnetic resonance. The power receiving resonant coil 246 supplies received power or current to the power fetching unit 242. The power fetching unit 242 may receive power from the power receiving resonant coil 246 via the power fetching coil 244 by the electromagnetic induction. In this case, the power receiving resonant coil 246 and the power fetching coil 244 are located at a sufficiently short distance that power can be supplied by the electromagnetic induction, and the resonant frequency of the power fetching coil 244 need not be considered.

The power fetching unit 242 supplies the alternating current to the rectification unit 235 as a load. The charging circuit 262 of the devices 260, 360, and 460 is adapted so as to supply a DC voltage to a battery 264. The battery 264 supplies a required DC voltage in the devices 260, 360, and 460.

Figure 5A:
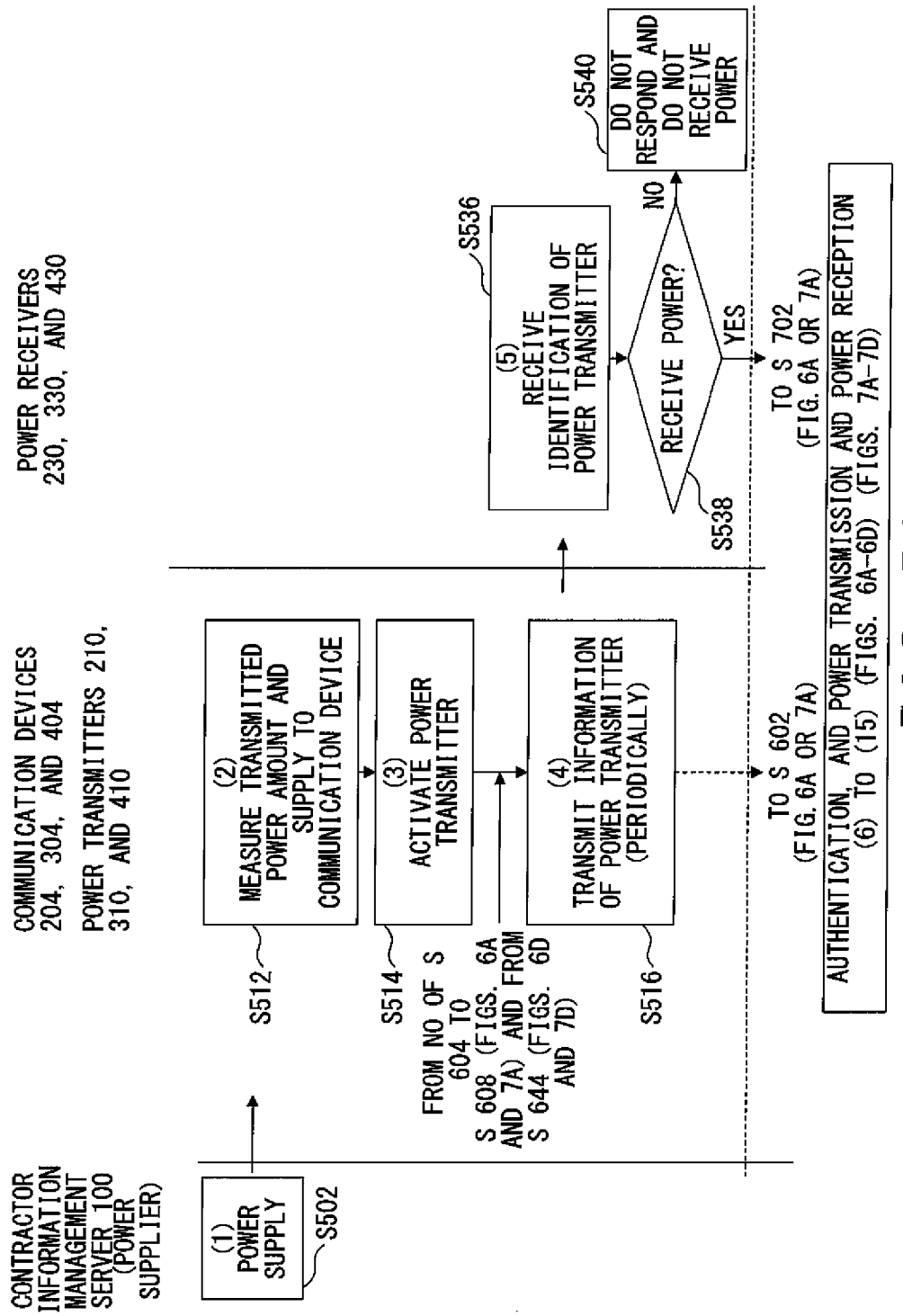
FIGS. 5A and 5B respectively illustrate one example of a contractor information management server in FIGS. 1A-1B and 2A-2B, and a processing and a communication procedure for a power supply between a plural set of communication devices as well as the power transmitter and the power receivers.
Figure 5B:
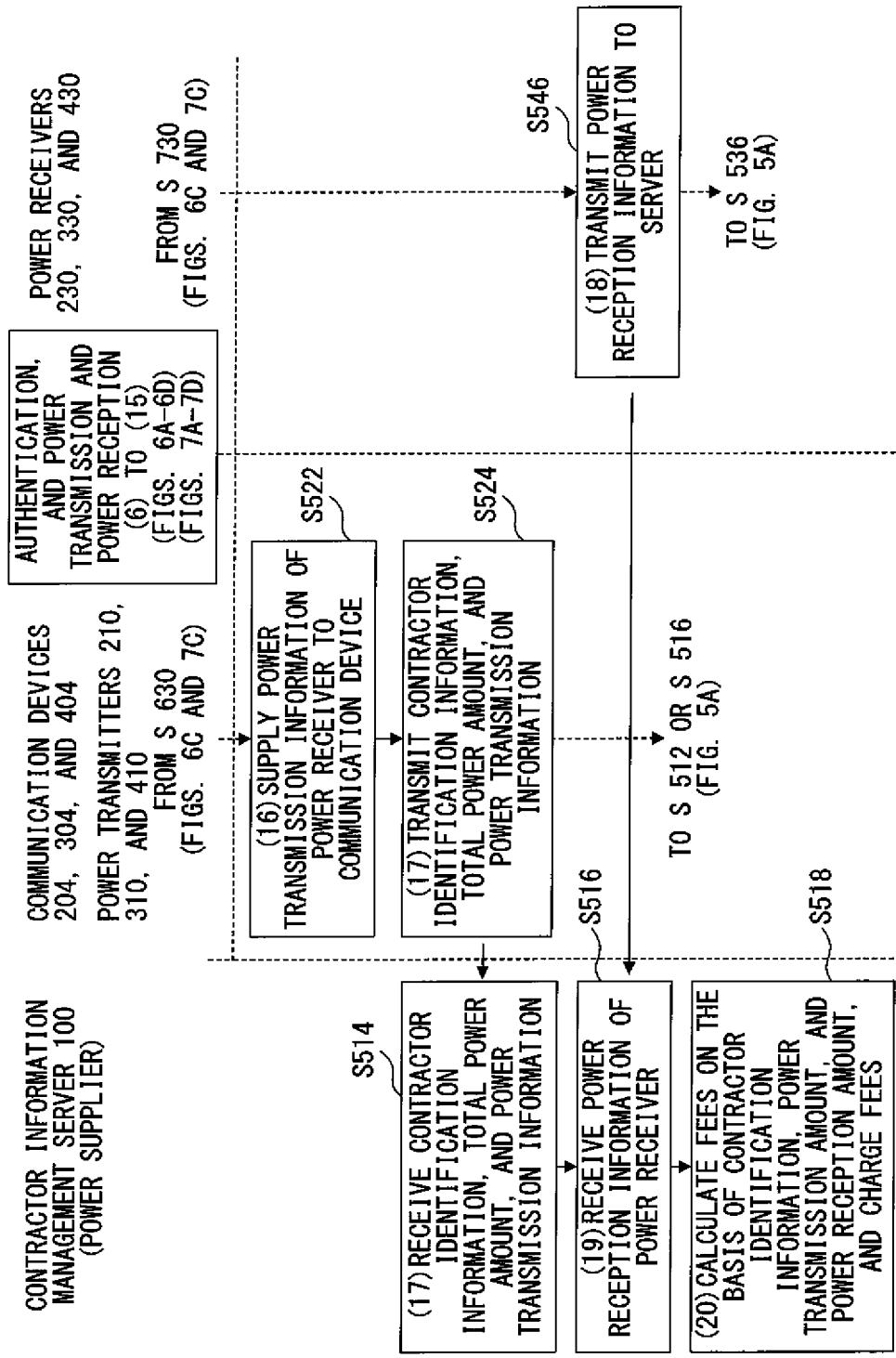

FIGS. 5A and 5B illustrate one example of processing and a communication procedure for supplying power between a contractor information management server 100, a set of a plurality of communication devices 204, 304, and 404, a plurality of power transmitters 210, 310, and 410, and a plurality of power receivers 230, 330, and 430.

In reference to FIG. 5A, in step 502, the power suppliers of the contractor information management server 100 transmit power from an electric generation plant via a transmission line 40, and supply power to the power supply facilities of each contractor a, b, and x1 via the power meters 202, 302, and 402 (1).

In step 512, the power meters 202, 302, and 402 regularly or periodically supply the measured total power supply amount to the communication devices 204 and 304 (2). In step 514, a key 216 is operated by contractors a, b, c, and x1, power transmitters 230, 330, and 430 are activated, and using power supplied from the power meters 202, 302 and 402, power is supplied to the power transmitters 210, 310, and 410 (3). In step 516, the transceiver 218 of the power transmitters 210, 310, and 410 repeatedly transmits inquiry signals which include the identification information of the contractors a, b, and x1 and the identification information of the power transmitters 210, 310, and 410 with a cycle of, for example, 1 to 4 seconds, and waits for the reception of the response from the power receivers 230, 330, and 430 (4). The identification information is stored in the memory 213. After that, the procedure moves on to step 602 in FIG. 6A or 7A.

In step 536, the transceiver 238 of the power receivers 230, 330, and 430 receive the inquiry signals which include the identification information of the contractors a, b, and x1 and the identification information of the power transmitters 210, 310, and 410 from the power transmitters 210, 310, and 410 (5). The power receivers 230, 330, and 430 may always be in a state of reception or a preparation completed state of power reception under the control of the controlling unit 232, or the power receivers 230, 330, and 430 may be set as a state of reception or as a preparation completed state of power reception in accordance with the operation by the key 236 of the power receivers 230, 330, and 430 of contractors a, b, and c.

In step 538, the controlling unit 232, in response to the inquiry signals, decides whether or not to receive power from the power transmitters 210, 310, and 410. The controlling unit 232 decides to receive power when the power receivers 230, 330, and 430 are in a preparation completed state of power reception. When a decision is made to receive power, the procedure moves into a step 702 of FIG. 6A or 7A. When a decision is made not to receive power, or when a decision is made that it is not in a preparation completed state of power reception in step 538, the controlling unit 232 does not respond to the inquiry signals and does not receive power in step 540.

FIGS. 6A-6D illustrate an example of processing and of a communication procedure for a power supply between power transmitters 210, 310, and 410, and power receivers 230, 330, and 430, after the processing procedure of FIG. 5A and before the processing procedure of FIG. 5B. For purposes of explanation, it is assumed that the power transmission and the power reception are performed between the power transmitter 210 and the power receiver 230. The processing and the communication procedure of FIGS. 6A-6D are also applied to the other power transmitters 310 and 410, and the other power receivers 330 and 430.

Figure 6A:
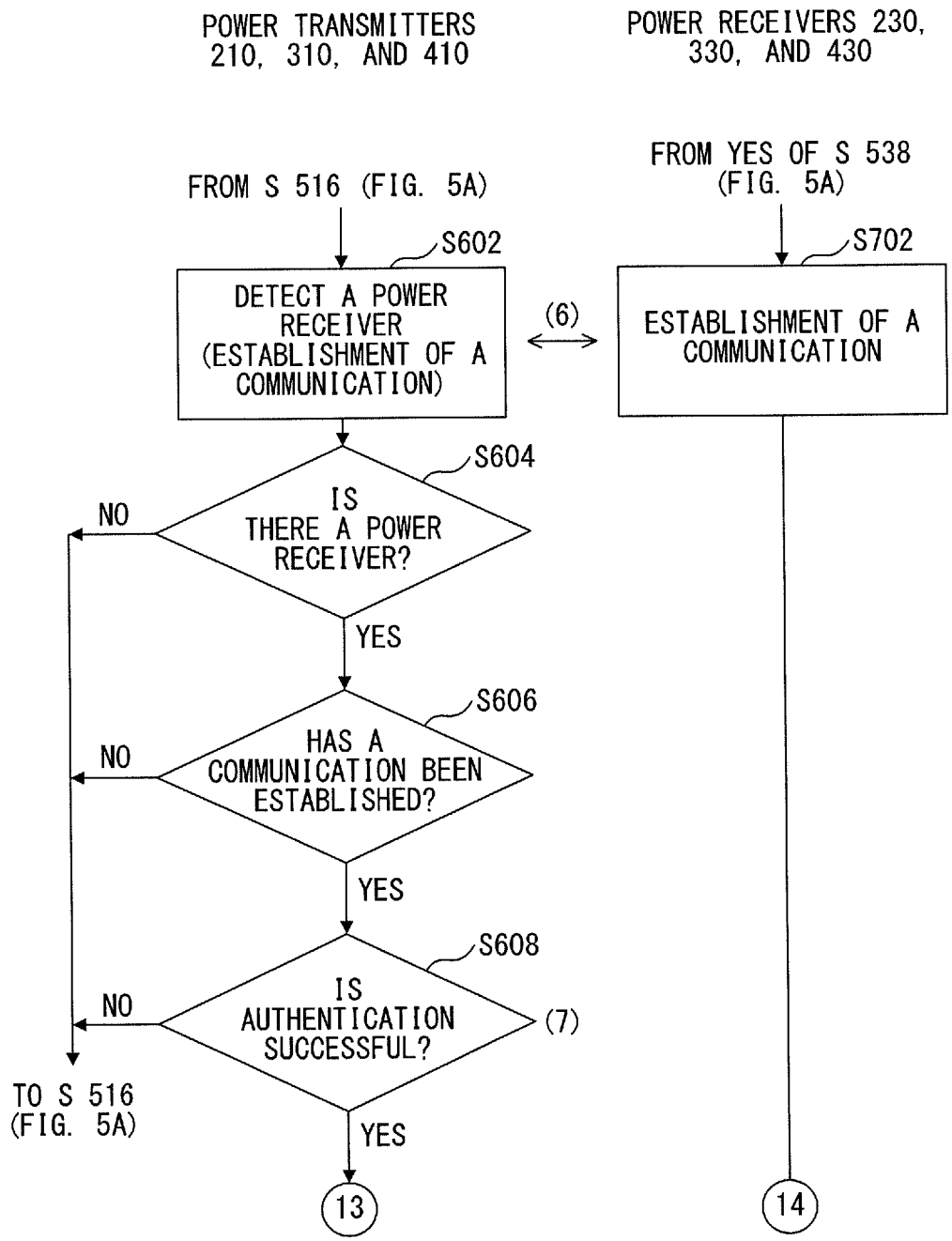
FIGS. 6A-6D respectively illustrate one example of a processing and communication procedure for a power supply between the power transmitter and the power receiver after the procedure of FIG. 5A and before the procedure of FIG. 5B.

In reference to FIG. 6A, in step 702, the power receiver 230 is in a state of completed preparation for power reception and its controlling unit 232 transmits a response which includes the identification information of the contractor a of the power receiver 230 and the identification information of the power receiver 230 to the power transmitter 210 via the transceiver 238, thereby establishing the communication with the power transmitter 210 (6).

In step 602, the controlling unit 212 of the power transmitter 210 receives the identification information of the contractor a and of the power receiver 230 via the transceiver 218, thereby establishing the communication with the power receiver 230 (6). In step 604, the controlling unit 212 judges whether or not it received the response from the power receiver or whether or not the power receiver is present. When it is judged that it did not receive the response or that there is no power receiver present, the procedure goes back to step 516 of FIG. 5A. When it is judged that it received the response or that there is a power receiver present, the procedure moves on to step 606.

In step 606, the controlling unit 212 of the power transmitter 210 judges whether or not the communication was established with the power receiver 230. When it is judged that the communication was not established, the procedure goes back to step 516 of FIG. 5A. When it is judged that the communication was established, the procedure moves on to step 608.

In step 608, the controlling unit 212 of the power transmitter 210 authenticates the power receiver 230 on the basis of the identification information of the contractors a, b, c of the power receivers 230, 330, and 430 and/or the identification information of the power receivers 230, 330, and 430 stored in the memory 213 beforehand (7). When it has received a response which includes identification information not in the memory 213, the controlling unit 212 may access the data base 106 of the contractor information management server 100 via a communication device 204, acquire contractor information which includes the identification information which corresponds to the received identification information (a) and the information of transmission condition or reception condition, and the like, and authenticate the power receiver 230. When it is judged that the authentication has failed, the procedure goes back to step 516 of FIG. 5A. When it is judged that the authentication has succeeded, the procedure moves on to step 620.

In step 620, the controlling unit 212 of the power transmitter 210 transmits the power transmitting condition stored in the memory 213 to the power receiver 230 via the transceiver 218, and receives the power receiving condition of the power receiver 230 from the power receiver 230 (8). In step 720, the controlling unit 212 of the power receiver 230 transmits the power receiving condition stored in the memory 233 to the power transmitter 210 via the transceiver 238, and receives the power transmitting condition of the power transmitter 210 from the power transmitter 210 (8).

The power transmitting condition in the power transmitter 210 may include, for example, the identification information of contractors a, and x1, and the identification information of the power transmitter 210. These pieces of identification information may be transmitted or received together with the power transmitting condition as the one separated from the power transmitting condition.

The power transmitting condition may include information of, for example, at least one selectable power transmitting resonant frequency ft, an outer diameter of the power transmitting resonant coil, a range of the power transmission efficiency kt (lower threshold value $k_{th}$), whether or not a simultaneous power transmission by a plurality of power transmitters is allowed, or whether or not a simultaneous power reception by a plurality of power receivers is allowed. The threshold value $k_{th}$ may be a certain value within the range of, for example, 60 to 80%. The power transmitting condition may further include information of the range of the power transmission voltage (V), the range of the transmitted power (W), the maximum power transmission amount or power reception amount (Wh), a time length for permissible power transmission and power reception (second), and the like. The power transmitting condition may further include information of whether or not power is being transmitted to the other power receiver at present, whether or not power has started to be transmitted to the other power receiver, or whether or not the power receiver which is the current power transmission destination allows simultaneous power transmission.

The power transmission efficiency kt indicates the ratio of the power portion Pr received by the transmitted power portion Pt to the transmitted power portion Pt contributing to the received power of the power receiver at a specific power transmission destination in power transmitters 210, 310, and 410. The transmitted power portion contributing to the received power of the power receiver of the other power transmission destination is excluded. The received power portion to which the transmitted power of the power transmitter of the other transmission source contributes is excluded.

The power receiving condition in the power receiver 230 may include, for example, the identification information of contractors a and the identification information of the power receiver 230. These pieces of identification information may be transmitted or received together with the power receiving condition as the one separated from the power receiving condition.

The power receiving condition may include information of, for example, at least one selectable power receiving resonant frequency fr, an outer diameter of the power receiving resonant coil, a permissible range of a power reception efficiency kr (lower threshold value $k_{th}$), whether or not a simultaneous power transmission by a plurality of power transmitters is allowed, or whether or not a simultaneous power reception by a plurality of power receivers is allowed. The power receiving condition may further include information of the range of the power reception voltage (V), the range of the received power (W), the maximum power reception amount (Wh), a time length for permissible power reception (second), and the like. The power receiving condition may further include information of whether or not power is being received from the other power transmitter at present, whether or not power has begun to be received from the other power receiver, or whether or not the power transmitter which is the current power transmission source allows simultaneous power reception. When the power receiver 230 is being received power from the other power transmitter (for example, 310) currently, the transmitted power from the power transmitter (310) and the currently received power and power reception efficiency (kr) may be included as power receiving conditions.

The power reception efficiency kr indicates the ratio of the power portion Pr received by the transmitted power portion Pt to the transmitted power portion Pt of the specific power transmission source contributing to the received power in power receivers 230, 330, or 430. The received power portion to which the transmitted power of the power transmitter of the other transmission source contributes is excluded. The transmitted power portion contributing to the received power of the power receiver of the other power transmission destination is excluded.

In step 621, the controlling unit 212 of the power transmitter 210 judges whether or not the power transmitting condition and the power receiving condition fit together, or conform. When it is judged that they fit together, the procedure moves on to step 622. When it is judged that they do not, the procedure moves on to step 640 of FIG. 6D. In step 721, the controlling unit 232 judges whether or not the power transmitting condition and the power receiving condition fit together, or conform. When it is judged that they fit together, the procedure moves on to step 722. When it is judged that they do not, the procedure moves on to step 741 of FIG. 6D.

If it is judged that any of the power transmitting resonant frequencies ft and any of the power receiving resonant frequencies fr might substantially fit together, it is judged that the power transmitting condition and the power receiving condition fit together with respect to the resonant frequencies. Otherwise, for example, it is judged that the power transmitting condition and the power receiving condition do not fit together. When, for example, a combination of the contractor a of the power transmitter 210 and the contractor c of the power receiver 430 is allowed, it is judged that the power transmitting condition and the power receiving condition fit together with respect to the combination of the contractors of the power transmitter and the power receiver. Otherwise, for example, it is judged that the power transmitting condition and the power receiving condition do not fit together.

For example, when both the power transmitter 210 and the power receiver 230 allow a simultaneous power reception by a plurality of power receivers, it is judged that the power transmitting condition and the power receiving condition fit together with respect to a simultaneous power reception. Alternately, when the power transmitter 210 allows a simultaneous power reception by a plurality of power receivers while the power receiver 230 does not, then it is judged that the power transmitting condition and the power receiving condition do not fit together when the power transmitter 210 is transmitting power to the other power receiver or tries to transmit power. In another case in which the power transmitter 210 allows a simultaneous power reception by a plurality of power receivers while the power receiver 230 does not, then it may be judged that the power transmitting condition and the power receiving condition fit together when the power transmitter 210 is not transmitting power to the other power receiver and does not try to transmit power. In this case, the power transmitting condition and the power receiving condition do not fit together between the power transmitter 210 and the other power receiver (330) even if the other power receiver (330) tries to receive power simultaneously from the power transmitter 210 later.

As another example, when both the power transmitter 210 and the power receiver 230 allow a simultaneous power transmission by a plurality of power transmitters, it is judged that the power transmitting condition and the power receiving condition fit together with respect to a simultaneous power reception. Alternately, when the power receiver 230 allows a simultaneous power transmission by a plurality of power transmitters while the power transmitter 210 does not, it is judged that the power transmitting condition and the power receiving condition do not fit together when the power receiver 230 is receiving power from the other power transmitter or tries to receive power. In another case in which the power receiver 230 allows a simultaneous power transmission by a plurality of power transmitters while the power transmitter 210 does not, it may be judged that the power transmitting condition and the power receiving condition fit together when the power receiver 230 is not receiving power from the other power transmitter and does not try to receive power. In this case, the power transmitting condition and the power receiving condition do not fit together between the power receiver 230 and the other power transmitter (310) even if the other power transmitter (310) tries to transmit power simultaneously to the power receiver 230 later.

In step 622, the controlling unit 212 of the power transmitter 210 transmits information which indicates that a temporary power transmission to the power receiver 230 via the transceiver 218 needs to be performed. Subsequently, the controlling unit 212 activates the modulating unit 214, the amplifier 216, and the power transmitting resonant coil 226, adjusts the frequency and level, supplies power to the power supplying unit 222, and transmits power temporarily or transiently via the power transmitting resonant coil 226 (9). The controlling unit 212 measures the voltage and the current supplied to the power supplying unit 222, and obtains the transmitted power. In step 722, the controlling unit 232 of the power receiver 230 receives information which indicates that a temporary power transmission from the power transmitter 210 via the transceiver 238 needs to be performed. The controlling unit 232, in response to the reception, activates the rectification unit 236 and the power receiving resonant coil 246, adjusts the frequency, fetches power from the power fetching unit 242 via the power receiving resonant coil 246, and receives power temporarily or transiently (9). The controlling unit 232 measures the voltage and the current supplied from the power fetching unit 242, and obtains the received power.

Figure 6B:
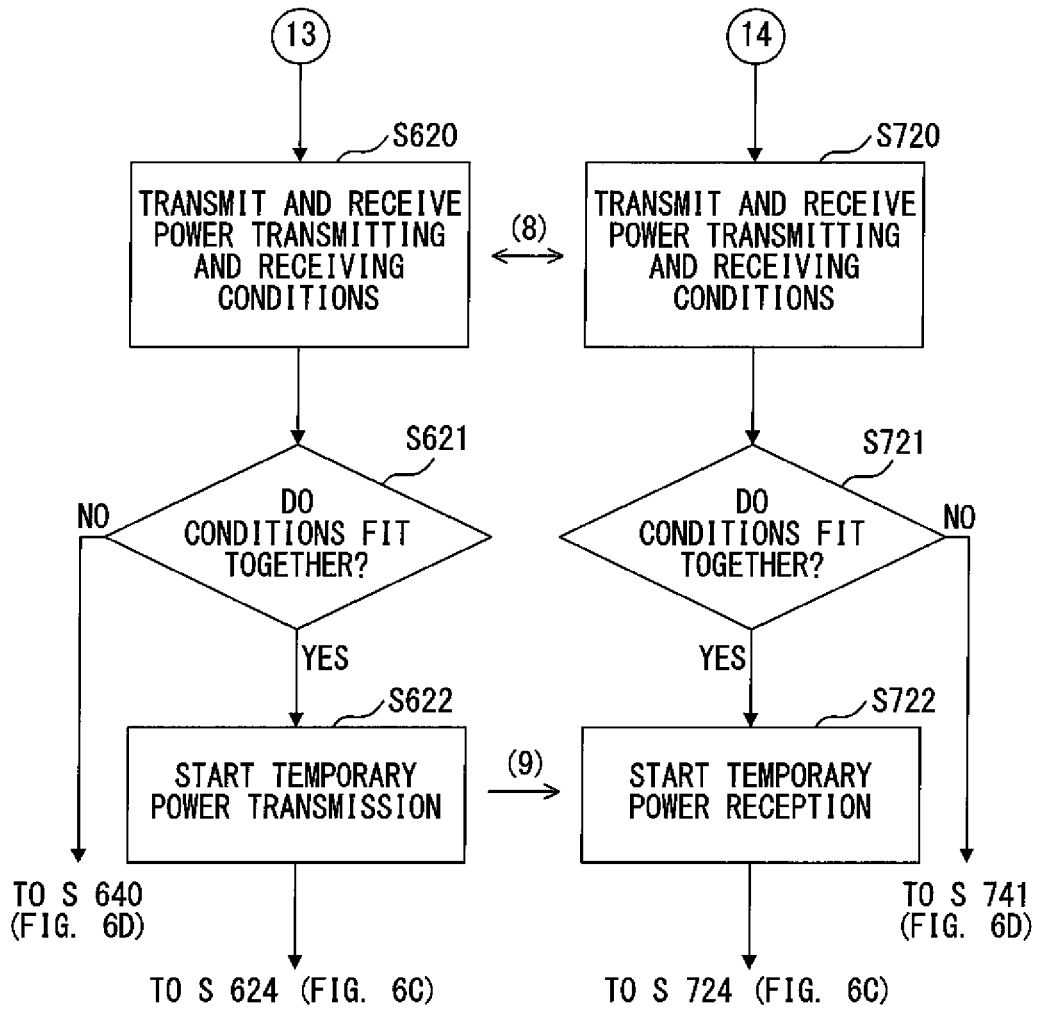
Figure 6C:
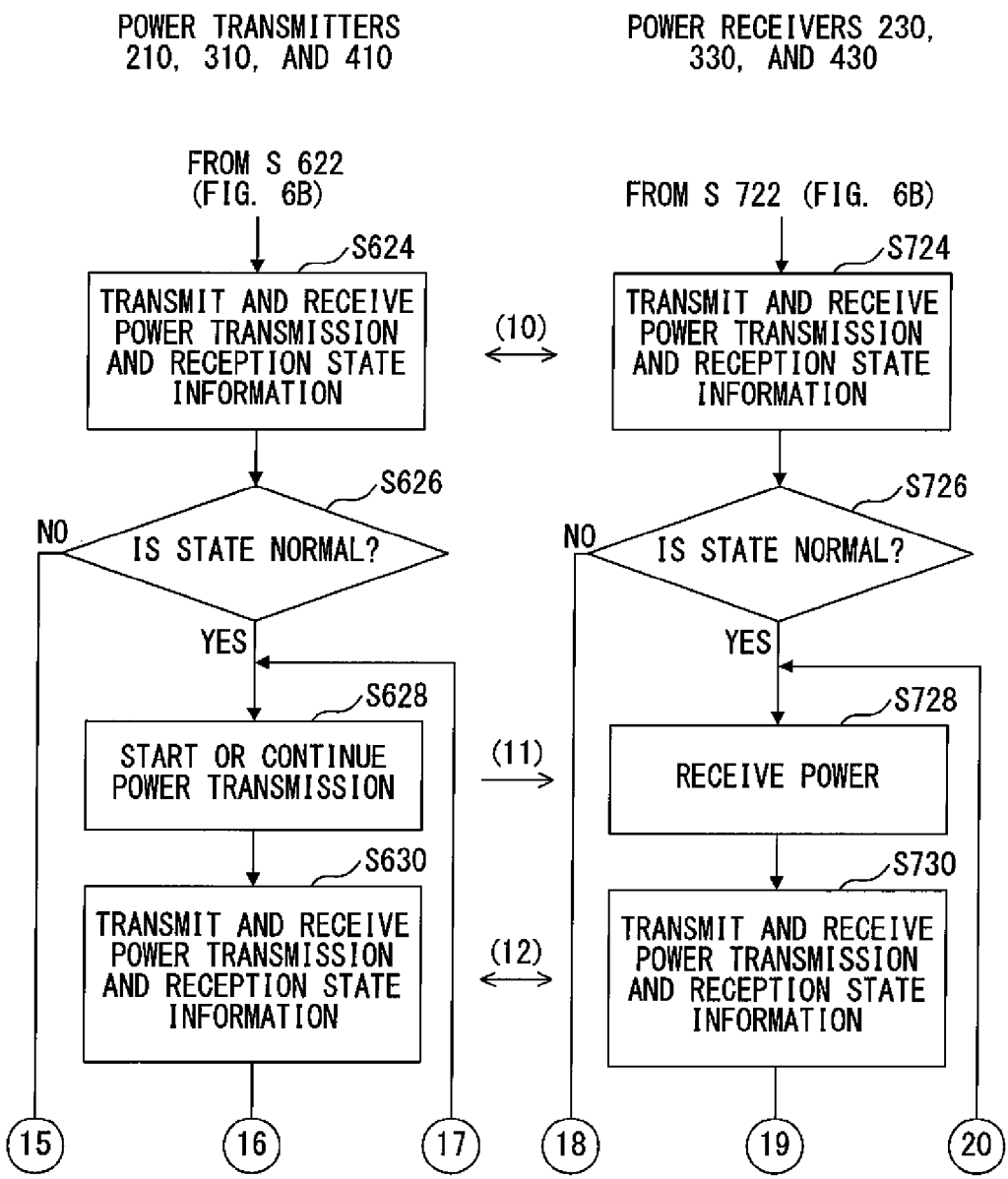

In reference to FIG. 6C, in step 624, the controlling unit 212 of the power transmitter 210 transmits the information of the power transmission state to the power receiver 230 via the transceiver 218, and receives the information of the power reception state from the power receiver 230 (10). In step 724, the controlling unit 232 of the power receiver 230 transmits the information of the power reception state to the power transmitter 210 via the transceiver 238, and receives the information of the power transmission state from the power transmitter 210 (10).

The power transmission state of the power transmitter 210 includes the current transmitted power (total), the transmitted power to the power receiver of a transmission address (correspondent) before the simultaneous power transmission, the transmitted power to the other power receiver which is not a transmission address before the simultaneous power transmission, and the received power. In addition, the power transmission state may include the current (estimated) transmitted power to the power receiver of the transmission address, the current (estimated) transmitted power to the other power receiver, which is not the transmission address, and the current (estimated) power transmission efficiency kt of the transmitted power portion Pt to the power receiver of the transmission address. Further, the power transmission state may include (estimated) power transmission efficiency kt to the total (estimated) received power portion of the power transmission destination to which the transmitted power contributes with respect to the total transmitted power Pt of the power transmitter 210, and the current (estimated) power transmission efficiency kt of the transmitted power portion Pt to the power receiver which is not the transmission address. The power transmission state may further include information of, for example, completion of the power transmission, stopping of the power transmission, and a normality (whether normal or abnormal) of the power transmission state.

The power reception state of the power receiver 230 includes the currently received power (total), the received power from the power transmitter of a transmission address before the simultaneous power reception, the transmitted power from the other power transmitter which is not a transmission address before the simultaneous power reception, and the received power. In addition, the power reception state may include the current (estimated) received power from the power transmitter of the transmission address, the current (estimated) transmitted power and received power from the other power transmitter which is not the transmission address, and the current (estimated) power transmission efficiency kr of the received power portion Pr from the power transmitter of the transmission address. The power reception state may further include information which indicates that the power is being received from the other power transmitter which is not the transmission address before the simultaneous power reception. Further, the power reception state may include the power reception efficiency kr of the total received power with respect to the total (estimated) transmitted power portion from all the power transmitters of the power transmission source which contribute to the received power of the power receiver 230. The power reception state may further include information of, for example, completion of the power reception, stopping of the power reception, and the normality (whether normal or abnormal) of the power reception state.

In step 626, the controlling unit 212 of the power transmitter 210 judges whether or not the power transmission state of the power transmitter 210 and the power reception state of the power receiver 230 are normal. When it is judged that the power transmission state and the power reception state are normal, the procedure moves on to step 628. When it is judged that the power transmission state and the power reception state are abnormal, the procedure moves on to step 640.

In step 726, the controlling unit 232 of the power receiver 230 judges whether or not the power transmission state of the power transmitter 210 and the power reception state of the power receiver 230 are normal. When it is judged that the power transmission state and the power reception state are normal, the procedure moves on to step 728. When it is judged that the power transmission state and the power reception state are abnormal, the procedure moves on to step 741.

In step 626 and step 726, whether or not the power transmission state and the power reception state are normal may be judged, for example, as follows.

When the power transmission efficiency kt is not greater than the threshold value $k_{th}$, it may be judged that the power transmission state is abnormal.

When the power reception efficiency kr is not greater than the threshold value $k_{th}$, it may be judged that the power reception state is abnormal.

When the entirety or later of the power transmission efficiency kt or of the power reception efficiency kr in the simultaneous temporary power reception by a plurality of power receivers become not greater than the threshold value $k_{th}$ with respect to all the selectable resonant frequencies fr=ft, it may be judged that only the power reception state of the later power receiver (e.g., 330) having a low priority is abnormal. In this case, it is possible that the power reception environment of the later power receiver is inappropriate.

When the entirety or later of the power transmission efficiency kt of the power transmission in the simultaneous temporary power transmission by a plurality of power transmitters become not greater than the threshold value $k_{th}$ with respect to all the selectable resonant frequencies fr=ft, it may be judged that only the power transmission state of the later power transmitter (e.g., 310) having a low priority is abnormal. For example, when the phase of the power transmission magnetic field of the two power transmitters 210 and 310 are in reverse phase with each other, it is possible that the entirety or each of the respective power transmission efficiencies kt greatly lowers in the temporary power transmission.

In a case in which the temperature of a temperature sensor 228 or 248 rises over the threshold value, it may be judged that the power transmission state or the power reception state is abnormal.

In step 628, the controlling unit 212 of the power transmitter 210 transmits information which indicates the start-up or continuation of the power transmission, and further, it may transmit information which indicates the selected power receiving resonant frequencies fr. As required, the controlling unit 212 may control the modulating unit 214, the amplifier 215, and the power transmitting unit 220, adjust the power transmitting resonant frequency ft of the power transmitting resonant coil 226, and start or continue power transmission to the power receiver 230 (11). In step 728, the controlling unit 232 of the power receiving unit 230 receives information which indicates the start-up or continuation of the power transmission and indicates a power receiving resonant frequency fr, and as required it controls the power receiving unit 240 and the rectification unit 235 so as to receive the transmitted power and start or continue the power reception (11). The controlling unit 232 may adjust the power receiving resonant frequency fr of the power receiving resonant coil 246 following information which indicates the received power receiving resonant frequency fr.

In step 630, the controlling unit 212 of the power transmitter 210 transmits information of the power transmission state to the power receiver 230 via the transceiver 218, and receives information of the above mentioned power reception state from the power receiver 230 (12). In step 730, the controlling unit 232 of the power receiver 230 transmits information of the power reception state to the power transmitter 210 via the transceiver 238, and receives information of the above mentioned power transmission state from the power transmitter 210 (12).

In step 628 or 630, the controlling unit 212 of the power transmitter 210 may further transmit the identification information of the contractor a of the power transmitter 210 and the identification information of the power transmitter 210 in order to authenticate the power receiver 230 via a transceiver 218, receive the identification information for authentication from the power receiver 230, and authenticate the power receiver 230. The controlling unit 232 of the power receiver 230, in step 728 or 730, may further transmit the identification information of the contractor a of the power receiver 230 and the identification information of the power receiver 230 for authentication to the power transmitter 210 via the transceiver 238, and receive identification information for authentication from the power transmitter 210 and authenticate power transmitter 210.

In step 636, the controlling unit 212 of the power transmitter 210 judges whether or not the power transmission from the power transmitter 210 to the power receiver 230 is possible or whether or not the power reception by the power receiver 230 is possible, on the basis of the power transmission state information, the power reception state, and the authentication result. When it is judged that it is not possible, the procedure moves on to step 640. When it is judged that it is possible, it is judged whether or not the controlling unit 212 completes the power transmission in step 638.

When the controlling unit 212 decides not to complete the power transmission in step 638, the procedure goes back to step 628. When it decides to complete the power transmission in step 638, the procedure moves on to step 640. In step 640, the controlling unit 212 performs control to stop the modulating unit 214 and the amplifier 215 and stops the power transmission (14).

In step 740, the controlling unit 232 of the power receiver 230 judges whether or not to stop the power reception. When it decides to stop the power reception, the procedure moves on to step 741. When it decides not to stop the power reception, the procedure goes back to step 728. In step 741, the controlling unit 232 performs control to stop the power receiving unit 240 and the rectification unit 236, and completes the power reception (14).

The following are examples of cases that are judged as incapable of receiving power in step 636. The exemplary cases include when the power transmission state and the power reception state in step 628 are not normal as mentioned above, when the power receiver 230 fails to be authenticated, and when the information of the power reception state is not received over the time of the threshold value (e.g., 2 seconds).

When, for example, the power transmission efficiency kt is not greater than the threshold value $k_{th}$, it may be judged that the power transmission state is abnormal and that it is incapable of receiving power.

When, for example, the power transmission efficiency kt of the entirety or the latter of the power transmission in the simultaneous power reception by a plurality of power receivers becomes not greater than the threshold value $k_{th}$, it may be judged that only the power reception state of the latter power receiver (e.g., 330), having a low priority, is abnormal and that it is incapable of receiving power.

The following are examples of cases in which it is judged that the power transmission is completed in step 638. The exemplary cases include when the user of the power transmitter 210 operates a key 216 of the power transmitter 210 to stop the power transmission, and when the power transmitter 210 receives information which indicates the stopping of the power reception from the power receiver 230.

The following are examples of cases in which it is judged that the power reception is completed in step 740. The exemplary cases include when the power transmission state and the power reception state in step 728 are not normal as mentioned above, when authentication of the power transmitter 210 fails, when the information of the power transmission state is not received over the time of the threshold value (e.g., 2 seconds), and when the power reception or the battery charging of the device 260 is completed. In addition, when the user of the power receiver 230 operates a key of the power receiver 230 to stop the power reception, and when the power receiver 230 receives information which indicates the stopping of the power transmission from the power transmitter 210, it is judged that the power reception is completed.

When, for example, the power reception efficiency kr is not greater than the threshold value $k_{th}$, it may be judged that the power reception state is abnormal and that it may stop power reception.

When, for example, the entirety or the latter of the power transmission efficiency kt or the power reception efficiency kr during the simultaneous power transmission by a plurality of power transmitters becomes not greater than the threshold value $k_{th}$, it may be judged that only the reception state from the latter power transmitter (e.g., 310), having a low priority, is abnormal and may stop power reception from the power transmitter. In this case, only the power transmission from the power transmitter (310) may be stopped.

When, for example, the power transmitting condition and the power receiving condition do not fit together after the start-up of the power transmission and the power reception, it may be judged that the power transmission state or the power reception state is abnormal and may stop the power transmission.

The power receiver 230 continues the power reception when the power reception from the other power transmitters (310) is continued, even when it receives information which indicates the stopping of the power transmission from the power transmitter 210 of the power transmission address. The power transmitter 210 continues the power transmission when the power transmission to the other power receiver (330) is continued, even when it receives a signal which indicates the stopping of the power reception from the power receiver 230 of the communication address.

In step 644, the controlling unit 212 of the power transmitter 210 completes the communication via the transceiver 218. The transceiver 218 may report the completion of the communication to the power receiver 230. In step 744, the controlling unit 232 of the power receiver 230 completes the communication via the transceiver 238. The transceiver 238 may report the completion of the communication to the power transmitter 210.

Subsequently, in the power transmitter 210, the procedure goes back to step 516 of FIG. 5A, and at the same time, moves on to step 522 of FIG. 5B. In the power receiver 230, the procedure moves on to step 546 of FIG. 5B.

In reference to FIG. 5B, in step 522, the controlling unit 212 of the power transmitter 210 supplies power transmission information which includes the identification information of the contractors a and x1 of the power transmitter 210, the identification information of the contractor a of the power receiver 230, the power transmission amount in each time period, and the like, to the communication device 204 via the interface 219 (16). The power transmission information is stored in the memory 213. The communication device 204 stores the power transmission information in the memory.

In step 524, the communication device 204 transmits the identification information of the contractor a or x1 with respect to the power meter 202, the total power supply amount of the power meter 202 at a measured time, and the power transmission information, stored in the memory, to the contractor information management server 100 via the network 50 (17). The power transmitter 210 may further transmit the power reception information of the power receiver 230 received in step 630 to the contractor information management server 100 via the communication device 204 and the network 50. By the power transmitter 210's transmitting the power reception information of the power receiver 230 to the contractor information management server 100, the accuracy of the power reception information transmitted by the power receiver 230 may be verified in the contractor information management server 100.

After that, the procedure goes back to step 512 or 516 of FIG. 5A.

In step 514, the processor 102 of the contractor information management server 100 receives the identification information of the contractor a or x1 with respect to the power meter 202 from the communication device 204, the total power supply amount of the power meter 202, and the power transmission information, and stores it in the storage device 104.

In step 546, the controlling unit 232 of the power receiver 230 transmits the power reception information which includes the identification information of the contractor a or x1 of the power transmitter 210, the identification information of the contractor a of the power receiver 230, the power reception amount, and the like, to the contractor information management server 100 via the transceiver 239, the wireless base station 52, and the network 50 (18).

By the power receiver 230's transmitting the power reception information to the contractor information management server 100, accurate power reception information of the power receiver 230 may be transmitted, and the user of the power receiver 230 may confirm the transmission of the power reception information. In addition, with this, when the power reception information is transmitted only by the power transmitter 210, errors in the power reception information which are liable to occur when, for example, the wireless communication between the power receiver 230 and the power transmitter 210 stops or when the wireless communication between the power receiver 230 and the power transmitter 210 is not completed normally, may be prevented.

The power receiver 230 may further transmit the power transmission information of the power transmitter 210 received in step 730 to the contractor information management server 100 via the wireless base station 52 and the network 50. By the power receiver 230's transmitting the power transmission information to the contractor information management server 100, the accuracy of the power transmission information transmitted by the power transmitter 210 may be verified in the contractor information management server 100.

After that, the procedure may go back to step 536 of FIG. 5A.

In step 516, the processor 102 of the contractor information management server 100 receives the power reception information from the power receiver 330 via the network 50, and stores it in the storage device 104 (19).

In step 518, the processor 102 of the contractor information management server 100 fetches the identification information of the contractors a and x1 of the power transmitter 210, the identification information of the contractor a of the power receiver 230, the power transmission information which includes the power transmission amount, and the power reception information which includes the power reception amount from the storage device. The processor 102 calculates the power fees for the power reception amount applied to the power receiver 230 on the basis of the power transmission amount and the power reception amount between the power transmitter 210 and the power receiver 230 and charges the fees to the contractor of the power receiver 230 (20).

The processing and the communication procedure of FIGS. 6A-6D may be applied to the power transmission of the optional combinations between a plurality of the power transmitters 210, 310, and 410, and a plurality of the power receivers 230, 330, and 430. The plurality of the power transmitters 210, 310, and 410, when available, may transmit to one or more power receivers 230, 330, or 430 simultaneously. In addition, the plurality of the power receivers 230, 330, and 430, when available, may receive from one or more power transmitters 210, 310, or 410 simultaneously.

For example, it is presupposed that the power transmitter 210 has succeeded in authenticating the other power receiver 330 at a second thread in step 608 of FIG. 6A while transmitting power to the power receiver 230 at a first thread. In this case, the controlling unit 212 of the power transmitter 210 judges whether or not the conditions of the power transmission and the power reception between the power transmitter 210 and the power receiver 230 fit together with respect to the simultaneous power reception, and further judges whether or not the conditions with respect to the power transmission and the power reception between the power transmitter 210 and the power receiver 330 fit together. When it is judged that these conditions fit together, the procedure moves on to step 622. When it is judged that these conditions do not fit together, the procedure moves on to step 640. In step 640 of FIG. 6D, the controlling unit 212 transmits information which indicates the stopping of the power transmission to the other power receiver 330 via the transceiver 218. The controlling unit 232 of the power receiver 330, when it receives information which indicates the stopping of the power transmission via the transceiver 238, decides to stop the power reception in step 740.

As another example, it is presupposed that the power receiver 230 has succeeded in the authentication by the other power transmitter 310 at a second thread in step 608 of FIG. 6A while receiving power from the power transmitter 210 at a first thread. In this case, the controlling unit 232 of the power receiver 230 judges whether or not the conditions of the power transmission and the power reception between the power transmitter 210 and the power receiver 230 fit together with respect to the simultaneous power transmission, and further judges whether or not the conditions of the power transmission and the power reception between the power transmitter 310 and the power receiver 230 fit together in step 721. When it is judged that these conditions fit together, the procedure moves on to step 722. When it is judged that these conditions do not fit together, the procedure moves on to step 741. In step 741 of FIG. 6D, the controlling unit 232 transmits information which indicates the completion of the power reception to the other power transmitter 310 via the transceiver 238. The controlling unit 212 of the power transmitter 310, when it receives information which indicates the completion of the power reception via the transceiver 218, judges to complete the power transmission in step 638.

FIGS. 7A-7D respectively illustrate another example of a processing procedure for supplying power between the power transmitters 210, 310, and 410 and the power receivers 230, 330, and 430 after the processing procedure of FIG. 5A and before the processing procedure of FIG. 5B. For purposes of explanation, it is assumed that the power transmission and the power reception are performed between the power transmitter 210 and the power receiver 230. The processing procedure of FIGS. 7A-7D are also applied to the other power transmitters 310 and 410 and the other power receivers 330 and 430.

Figure 7A:
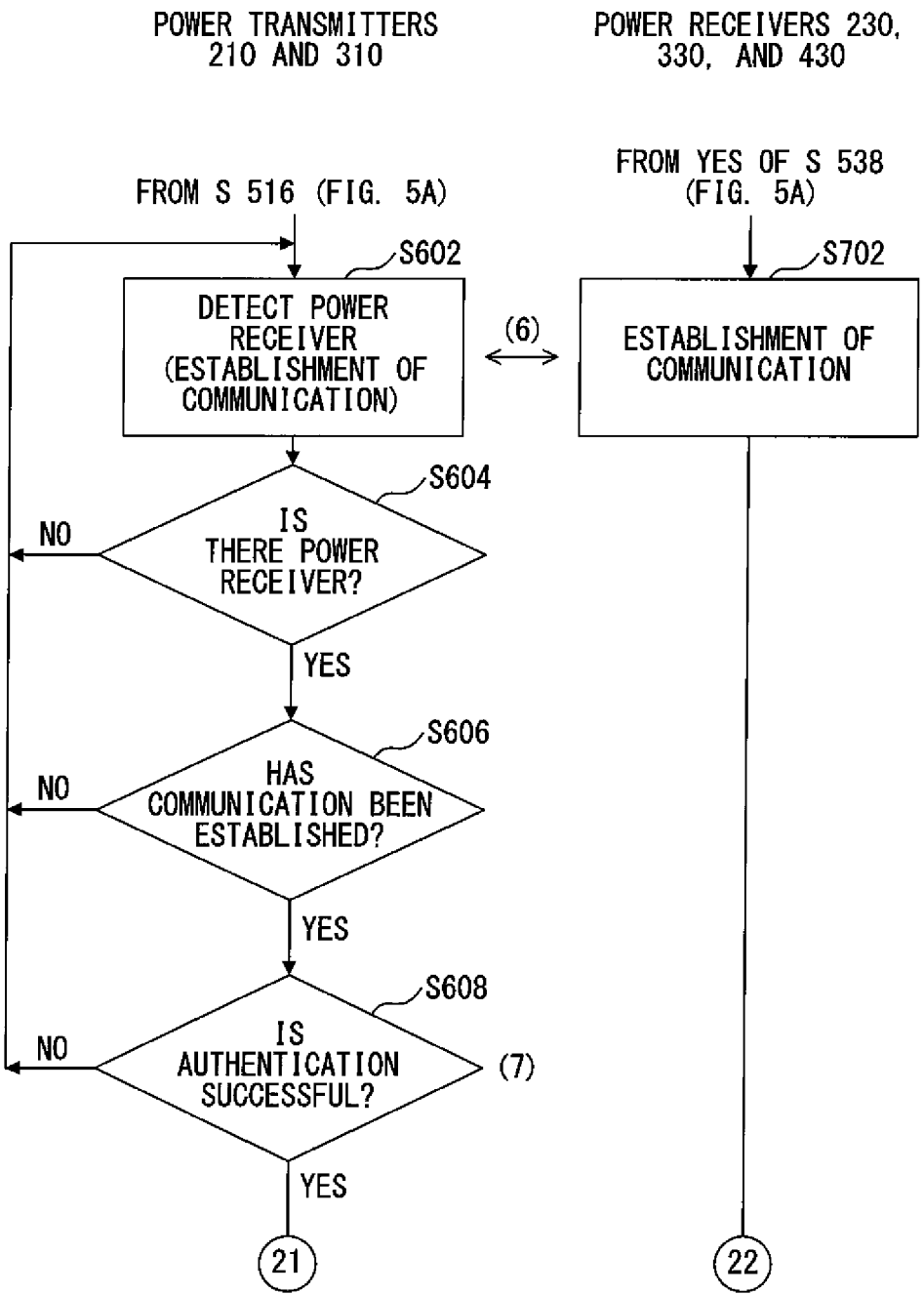
FIGS. 7A-7D respectively illustrate another example of a processing and communication procedure for the power supply between the power transmitter and the power receiver after the procedure of FIG. 5A and before the procedure of FIG. 5B.

In reference to FIG. 7A, steps 602 to 608 and step 702 are the same as those of FIG. 6A.

In step 610, the controlling unit 212 of the power transmitter 210 judges whether or not the power transmitter 210 is transmitting power or is trying to transmit power to the other power receiver (e.g., 330). When it is judged that the power transmitter 210 is not transmitting power or is not trying to transmit power to the other power receiver, the procedure moves on to step 620. When it is judged that the power transmitter 210 is transmitting power or is trying to transmit power to the other power receiver, in step 612, the controlling unit 212 transmits information which indicates that simultaneous power reception needs to be performed to the power receiver 230 via the transceiver 218 (8t). After that, the procedure moves on to step 620. When the information which indicates that simultaneous power reception needs to be performed is transmitted, in step 712, the controlling unit 232 of the power receiver 230 receives the information which indicates that simultaneous power reception needs to be performed by the power transmitter 210 via the transceiver 238 (8t). After that, the procedure moves on to step 720.

Steps 620 to 622 and 720 to 722 are the same as those of FIG. 6B. In steps 621 and 721, when the conditions do not fit together with respect to whether or not the power transmitting condition and the power receiving condition allow simultaneous power reception, the procedure moves on to steps 640 and 741 of FIG. 6D. In this case, the power reception is completed without performing power reception by the power receiver 230. When the conditions as to whether or not the power transmitting condition and the power receiving condition between the power transmitter 210 and the power receiver 230 and between the power transmitter 210 and the power receiver 330 allow simultaneous power reception are matched, the procedure moves on to steps 622 and 722. In regard to whether or not the power transmitting condition and the power receiving condition allow simultaneous power reception, even when the power receiving condition of the power receiver 230 allows the simultaneous power reception, when the power reception by the former other power receiver (330) has higher priority and the power receiving condition of the other power receiver (330) does not allow the simultaneous power reception, the conditions do not fit together and the power reception by the latter power receiver 230 is denied or stopped.

Figure 7B:
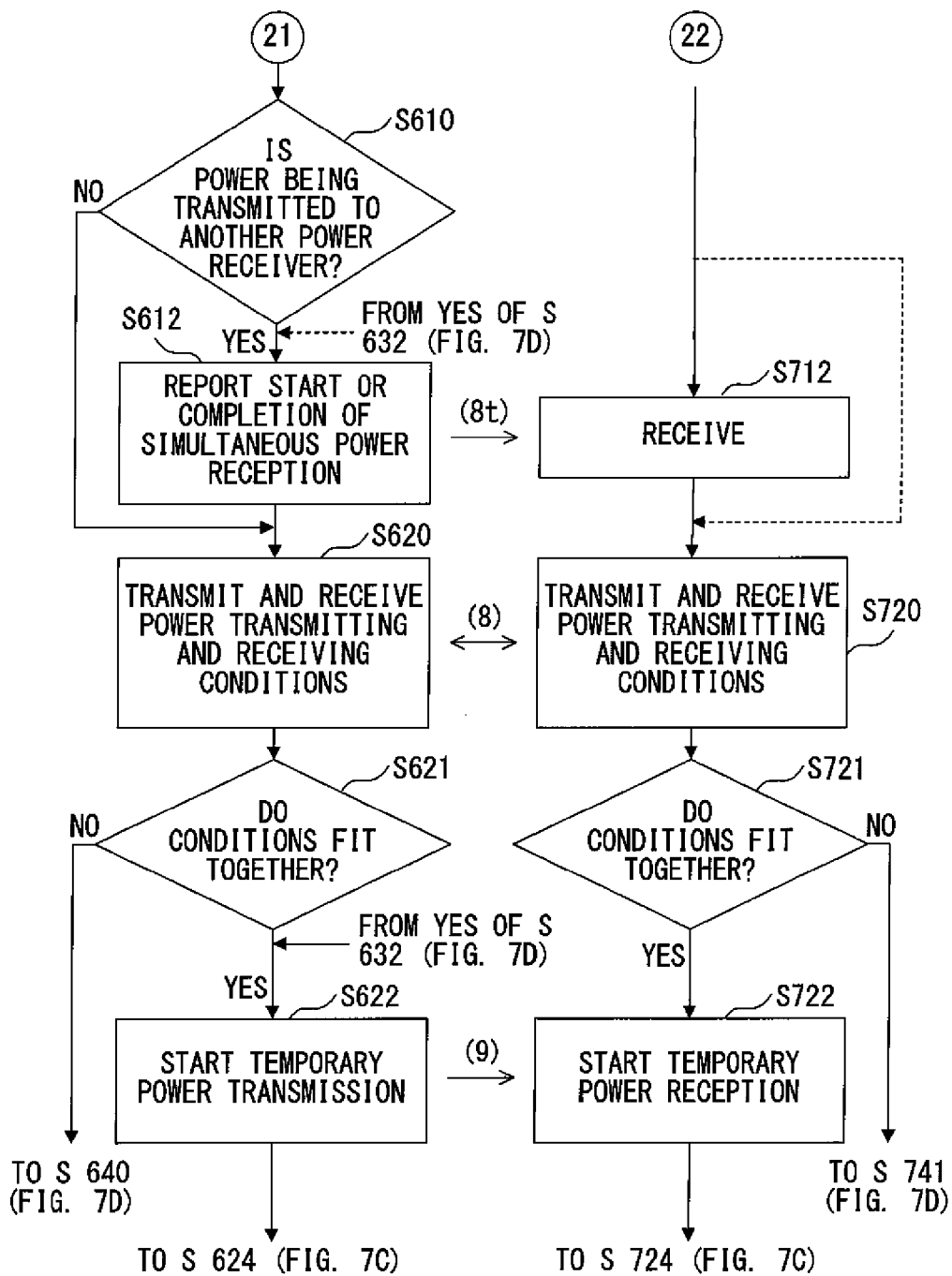
Figure 7C:
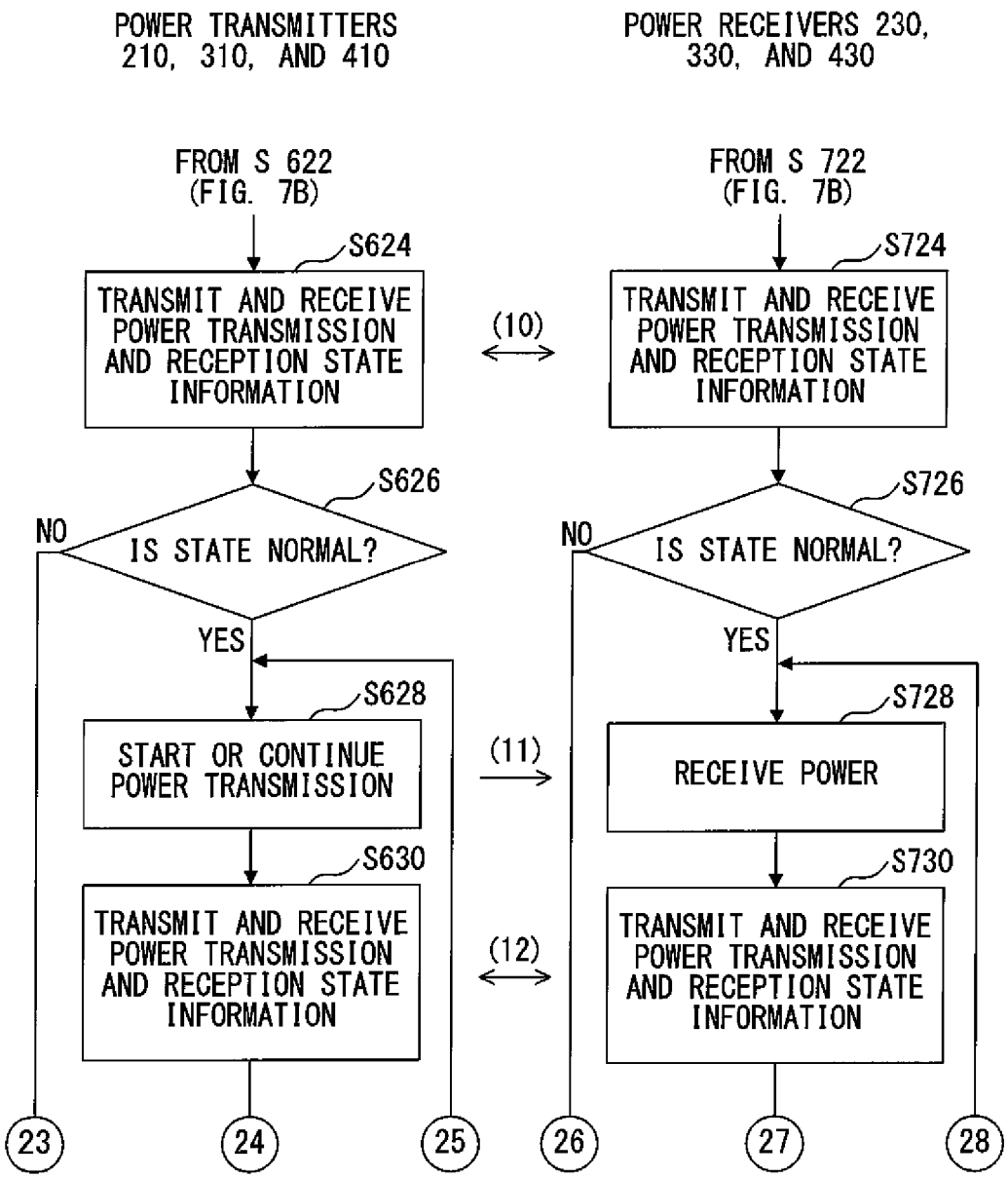

In reference to FIG. 7C, steps 624 to 630 and 724 to 730 are the same as those of FIG. 6C.

In step 632, the controlling unit 212 of the power transmitter 210 judges whether or not the other power reception by the other power receiver (e.g., 330) has been started or completed while the power is transmitted to the power receiver 210 by the power transmitter 210. The judgment as to whether or not the power reception by the other power receiver (330) has been started is made by judging whether or not the power transmitting condition and the power receiving condition between the power transmitter 210 and the power receiver 230 and between the power transmitter 210 and the power receiver 330 fit together, after the power transmitter 210 has succeeded in authenticating the other power receiver (330). Also, when the power reception by the other power receiver 330 has been completed (step 740), while the power receivers 230 and 330 are simultaneously receiving the power from the power transmitter 210, it is judged that the other power reception by the other power receiver is completed. When it is judged that the power reception by the other power receiver 330 has been started or completed, the procedure goes back to step 622.

In regard to whether or not the power transmitting condition and the power receiving condition allow the simultaneous power reception, the procedure goes back to step 622 of FIG. 7B even when the power transmitting condition and the power receiving condition between the power transmitter 210 and the power receivers 230 and 330 fit together and the simultaneous power reception is possible. With this, in step 622 and 722, the temporary power transmission and the temporary power reception between the power transmitter 210 and the power receivers 230 and 330 are started.

As an alternative embodiment, after a branching of YES (affirmation) in step 632, the procedure may go back to step 612. In this case, in step 612, the power transmitter 210 reports the starting-up or the completion of the simultaneous power reception to the power transmitter 230 as well, and between the power transmitter 210 and the power transmitter 230, steps 620 and 720 are executed again.

Concerning the judgment of whether or not the power reception by the other power receiver 330 has been started, when the power transmitting condition and the power receiving condition between the power transmitter 210 and the power receivers 230 and 330 do not fit together, the power reception by the other power receiver 330 is denied or stopped. In addition, when the power reception by the former power receiver 230 has priority and the simultaneous power reception is not allowed by the former power receiver 230, the power transmitting condition and the power receiving condition do not fit together, and the power reception by the latter other power receiver 330 is denied or stopped. When it is judged that the power transmitting condition and the power receiving condition do not fit together, the procedure moves on to step 636.

Figure 6D:
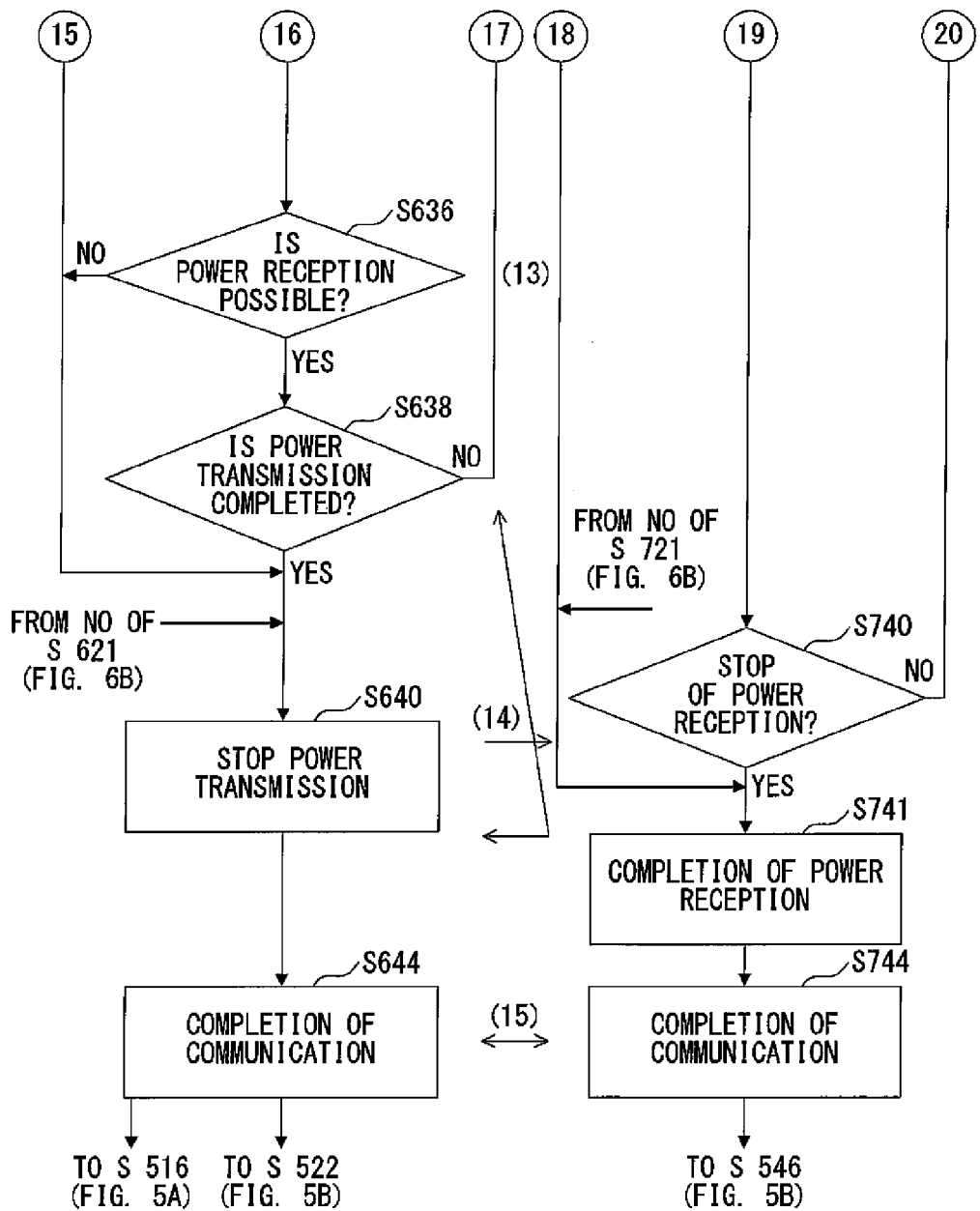

Steps 636 to 644 and 740 to 744 are the same as those of FIG. 6D.

Figure 8:
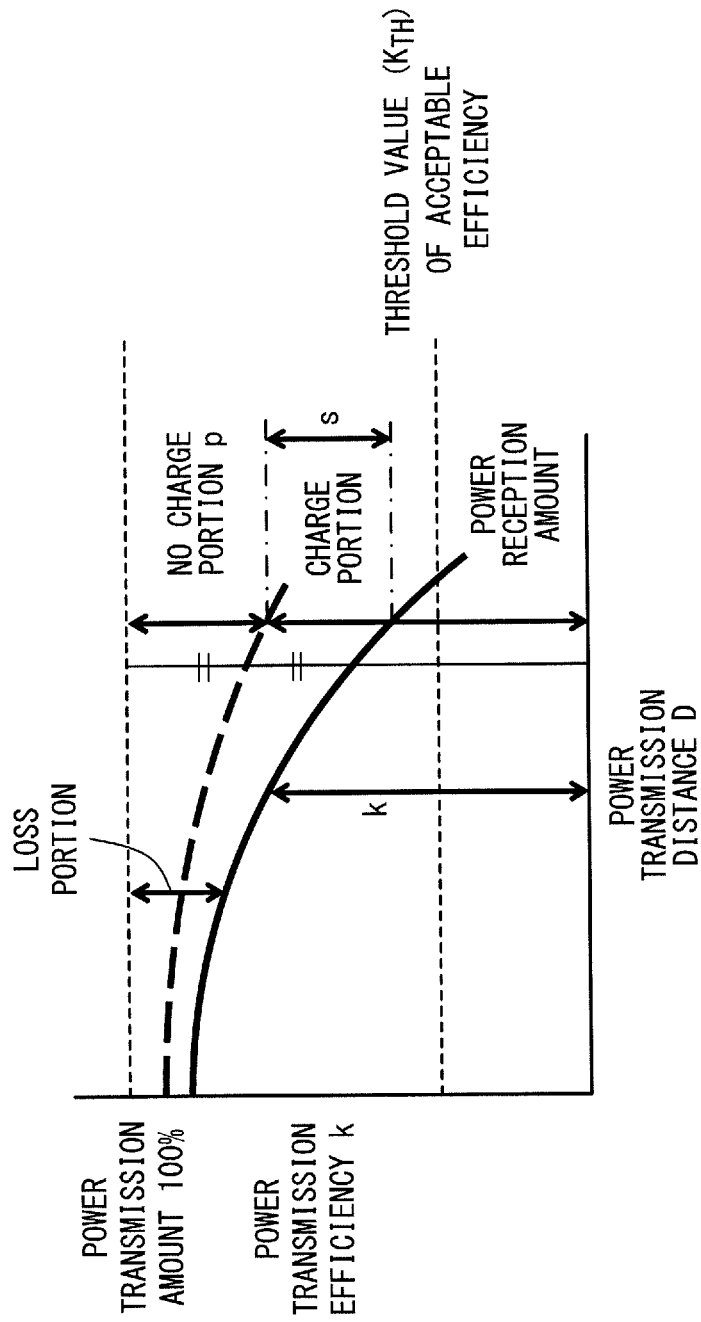
FIG. 8 illustrates one example of a change in a power transmission efficiency with respect to a power transmission distance from the power transmitter to the power receiver, and a calculation method of power fees for the power reception amount on the basis of the power transmission efficiency, performed by the contractor information management server.

FIG. 8 illustrates an example of changes in the power transmission efficiency k with respect to the power transmission distance D from the power transmitters 210, 310, and 410 to the power receivers 230, 330, and 430, and a method of calculating the power fees for the power reception amount Pr on the basis of the power transmission efficiency k is performed by the contractor information management server 100.

The power transmission efficiency k is represented by a percentage of the power reception amount Pr with respect to the power transmission amount Pt. In FIG. 8, generally, as the power transmission distance D between the power transmitter 210 and the power receiver 230 increases, the power transmission efficiency k gradually decreases as illustrated by a solid curved line. A difference Pt−Pr (i.e., 100−k %) between the power transmission amount Pt (i.e., 100%) and the power reception amount Pr (i.e., k %) becomes a loss.

This loss portion may be covered between the electric power company and the contractor a of the power receiver 230 with a predetermined ratio. For example, the loss portion may be covered between the electric power company and the contractor a of the power receiver 230 with a ratio of p:s=50%:50%. Alternatively, in order that the electric power company may cover more, for example, the ratio may be p/s>1. Alternatively, in order that the contractor a may cover more, for example, the ratio may be p/s<1.

The processor 102 of the contractor information management server 100 may calculate the fee C for the power reception amount Pr of the power receiver 230 by the following formula.

$$C = Pt \times (k+s)\% \times Y = (Pr \times 100/k) \times (k+s)\% \times Y$$

The processor 102 may charge the fee to the contractor a. Here, Y represents the fee or fee ratio for the power amount per unit Pu. Therefore, the power transmission amount Pt×p % becomes the loss portion or coverage of the electric suppliers. The ratio (k+s) % represents the coverage ratio of the contractor a.

When the power is fed simultaneously to a plurality of power receivers (230, 330, and 430) from one power transmitter 210, the fee may be prorated in accordance with the respective power reception amount (Pr1, Pr2, and Pr3) on the basis of the total power reception amount Pr. In this case, the fee C1 for the power reception amount Pr1 of the power receiver 230 may be calculated, for example, by the following formula.

$$C1 = (Pr \times 100/k) \times (k+s)\% \times Y \times (Pr1/Pr)$$

As an alternative embodiment, to the power receiver 230 which starts the power reception earlier, the fee for an actual power reception amount Pr1a during the simultaneous power reception on the basis of the power transmission efficiency k1 with respect to the power reception amount Pr1 before the start-up of the simultaneous power reception may be applied, and to the power receiver 330 which starts the power reception later by the simultaneous power reception, the fee may be applied on the basis of the estimated power transmission efficiency k2 for a remaining power reception amount Pr2 for the power reception amount Pr2 during the simultaneous power reception.

Concerning, for example, the power transmission efficiency k1 with respect to the former power receiver 230, and the power transmission efficiency k12 with respect to the two power receivers 230 and 330, since the power transmission amount Pt1 before the start of the simultaneous power reception is represented as Pt1=Pr1×100/k1, the fee C1 for the power reception amount Pr1a of the power receiver 230 with the simultaneous power reception being performed is represented by the following formula.

$$C1 = Pt1a \times (k1+s)\% \times Y$$

$$= (Pr1a \times 100/k1) \times (k1+s)\% \times Y$$

Here, Pt1a represents an estimated power transmission amount contributing to the power reception amount Pr1a.

In this case, the fee C2 for the power reception amount Pr2 of the power receiver 330 during the simultaneous power reception is represented, for example, by the following formula as a difference amount of the fee C with respect to the total power reception amount Pr and the fee C1 with respect to the power reception amount Pr1a.

$$C2 = Pt \times (k2+s)\% \times Y$$

$$= Pt \times (k12+s)\% \times Y - (Pr1a \times 100/k1) \times (k1+s)\% \times Y$$

$$= ((Pr1a+Pr2) \times 100/k12) \times (k12+s)\% \times Y - (Pr1a \times 100/k1) \times (k1+s)\% \times Y$$

Here, s2 represents an estimated coverage rate for the power reception amount Pr2 of the loss portion of the power transmission.

As an alternative embodiment, it may be configured that the power suppliers may charge the fee at the same rate on the basis of the power transmission efficiency k1 of the power transmission amount with respect to the power receiver 230 before the start of the simultaneous reception. In this case, the fee C2 for the power reception amount Pr2 of the power receiver 330 during the simultaneous power reception on the basis of the total power transmission amount Pt is represented, for example, by the following formula.

$$C2 = Pt2 \times (k2+s2)\% \times Y$$

$$= (Pt - Pt1) \times (k1+s)\% \times Y$$

$$= ((Pr1a+Pr2) \times 100/k12 - Pr1 \times 100/k1) \times (k1+s)\% \times Y$$

When the power is simultaneously fed to one power receiver 230 from a plurality of power transmitters (210, 310, and 410), the fee may be prorated in accordance with the respective power transmission amounts (Pt1, Pt2, and Pt3) on the basis of the total power transmission amount Pt and the total power reception amount Pr, and the respective fees for the power reception may be calculated separately. In this case, the fee C1 for the power reception amount Pr1 may be calculated, for example, by the following formula.

$$C1 = Pt \times (k+s)\% \times Y \times (Pt1/Pt)$$

$$= (Pr \times 100/k) \times (k+s)\% \times Y \times (Pt1/Pt)$$

In this case, the estimated power reception amount Pr1 from the power transmitter 210 is represented, for example, by the following formula.

$$Pr1 = Pr \times (Pt1/Pt)$$

As an alternative embodiment, to the power transmitter 210 which starts the power transmission earlier, the fee for an actual power transmission amount Pt1a may be applied during the simultaneous power transmission on the basis of the power transmission efficiency k with respect to the power transmission amount Pt1 at the start-up of the simultaneous power transmission, and to the power transmitter 310 which starts the power transmission later by the simultaneous power transmission, the fee may be applied on the basis of the estimated power transmission efficiency k2 for a remaining power transmission amount Pt2.

Concerning, for example, the power transmission efficiency k1 with respect to the former power transmitter 210, and the power transmission efficiency k12 with respect to the two power transmitters 210 and 310, since Pt1 before the start-up of the simultaneous power transmission is represented as Pt1=Pr1×100/k1, the fee C1 for the estimated power reception amount Pr1 which corresponds to the power transmission amount Pt1a of the power transmitter 210 during the simultaneous power transmission is represented by the following formula.

$$C1 = Pt1a \times (k1+s)\% \times Y$$

In this case, the fee C2 for the estimated power reception amount Pr2 which corresponds to the power transmission amount Pt2 of the power transmitter 310 during the simultaneous power transmission is represented, for example, by the following formula as a difference amount of the fee C with respect to the total power transmission amount Pt and the fee C1 with respect to the power transmission amount Pt1a.

$$C2 = Pt2 \times (k2+s2)\% \times Y$$

$$= Pt \times (k12+s)\% \times Y - Pt1a \times (k1+s)\% \times Y$$

$$= Pt \times (k12+s)\% \times Y - (Pr1a \times 100/k1) \times (k1+s)\% \times Y$$

Here, s2 represents an estimated coverage rate for the power transmission amount Pt2 of the loss portion of the power transmission.

As an alternative embodiment, it may be configured that the power suppliers may charge the fee at the same rate on the basis of the power transmission efficiency k1 of the power transmission amount of the power transmitter 210 before the start-up of the simultaneous power transmission. In this case, the fee C2 for the power transmission amount Pt2 of the power transmitter 310 during the simultaneous power transmission on the basis of the total power transmission amount Pt is represented, for example, by the following formula.

$$C2=Pt2\times(k2+s2)\%\times Y$$

$$=(Pt-Pt1)\times(k1+s)\%\times Y$$

When each of the plurality of the power transmitters simultaneously transmits power to the plurality of the power receivers, and each of the plurality of the power receivers simultaneously receives power from the plurality of the power transmitters, each power transmission amount (Pt1, Pt2, ...) and each power reception amount (Pr1, Pr2, ...) may be estimated by a proration on the basis of the total power transmission amount of the plurality of the power transmitters (Pt=Pt1+Pt2+...) and the total power reception amount of the plurality of the power receivers (Pr=Pr1+Pr2+...). As an alternative embodiment, by analyzing the sequential order of the start-up and the completion of the simultaneous power transmission and the simultaneous power reception between one power transmitter and one power receiver, the fees before the start-up of the simultaneous power transmission or the simultaneous power reception may be applied to the former power receiver, and the difference amount of the fees during the simultaneous power transmission and the fees before the simultaneous power transmission or the simultaneous power reception may be charged to the latter power receiver.

FIGS. 9A and 9B respectively illustrate an example of changes in the power transmission efficiency k for the power transmission distance D with respect to the different transmitting resonant frequencies and power receiving resonant frequencies f=F1, F2.

In the power transmission distance D=d1, the power transmission efficiency k with respect to the resonant frequency F1 in FIG. 9A is higher than the power transmission efficiency k with respect to the resonant frequency F2 in FIG. 9B. In the distance D=d2, the power transmission efficiency k with respect to the resonant frequency F1 in FIG. 9A is lower, to some extent, than the power transmission efficiency k with respect to the resonant frequency F2 in FIG. 9B. In the distance D=d3, and the power transmission efficiency k with respect to the resonant frequency F1 in FIG. 9A is substantially lower than the power transmission efficiency k with respect to the resonant frequency F2 in FIG. 9B.

Therefore, in step 622 of FIGS. 6B and 7B, the controlling unit 212 of the power transmitter 210 sequentially transmits the values of the different plurality of resonant frequencies ft=fr=F1, F2, and F3 at different time periods to the power receiver 230. The time period may be provided by the number of selectable different resonant frequencies ft=fr, or the time period may be provided by the number of representative resonant frequencies ft=fr, so that the power transmission efficiency k may be interpolated for the frequencies between the adjacent frequencies. In step 722 of FIGS. 6B and 7B, the controlling unit 232 of the power receiver 230 sequentially receives the values of the different plurality of resonant frequencies ft=fr=F1, F2, and F3 at a first time period and a second time period respectively from the power transmitter 210.

In the first time period, the power transmitter 210 adjusts the power transmitting resonant coil 226 to be the power transmitting resonant frequency ft=F1, and temporarily transmits power via the power transmitting unit 220. In the first time period, the power receiver 230 adjusts the power receiving resonant coil 246 to be the power receiving resonant frequency fr=F1, and temporarily receives power via the power receiving unit 240.

In the second time period, the power transmitter 210 adjusts the power transmitting resonant coil 226 to be the power transmitting resonant frequency ft=F2, and temporarily transmits power via the power transmitting unit 220. In the second time period, the power receiver 230 adjusts the power receiving resonant coil 246 to be the power receiving resonant frequency fr=F2, and temporarily receives power via the power receiving unit 240.

In the third time period, the power transmitter 210 adjusts the power transmitting resonant coil 226 to be the power transmitting resonant frequency ft=F3, and temporarily transmits power via the power transmitting unit 220. In the third time period, the power receiver 230 adjusts the power receiving resonant coil 246 to be the power receiving resonant frequency fr=F3, and temporarily receives power via the power receiving unit 240.

When some of the plurality of the power receivers have a high priority when the power receiver (e.g., 230) which starts power reception earlier has a higher priority, the power transmitter 210, in step 622, may transmit only the resonant frequency in the power transmission to the former power receiver (230) to the latter power receiver (330) in step 622 and may temporarily transmit power with only the resonant frequency.

In step 724, the power receiver 230 transmits each power reception amount in the first and second time periods to the power transmitter 210. In step 624, the power transmitter 210 receives each power reception amount in each time period from the power receiver 230. The power transmitter 210 (controlling unit 212) calculates the power transmission efficiency k on the basis of each power transmission amount and power reception amount for the power transmitting resonant frequency ft=fr=F1, F2, and F3, excludes the power transmitting resonant frequency ft which has generated a power transmission efficiency k of not greater than the threshold value, and selects the power transmitting resonant frequency ft=fr which has generated the higher power transmission efficiency k.

In step 622, when the power transmitter 210 temporarily transmits power to a plurality of power receivers 230, 330, and 430 simultaneously, it may select the power transmitting resonant frequency ft and the power receiving resonant frequency fr which generate the highest power transmission efficiency k of the total power reception amounts of the power receivers 230, 330, and 430 with respect to the total power transmission amounts of the power transmitter 210.

In step 628, the power transmitter 210 transmits information which indicates the start-up of the power transmission, for example information which indicates the power receiving resonant frequency fr=F1, and starts the power transmission. In step 728, the power receiver 230 receives information which indicates the start-up of the power transmission, for example information which indicates the power receiving resonant frequency fr=F1, and starts the power reception.

Figure 10A:
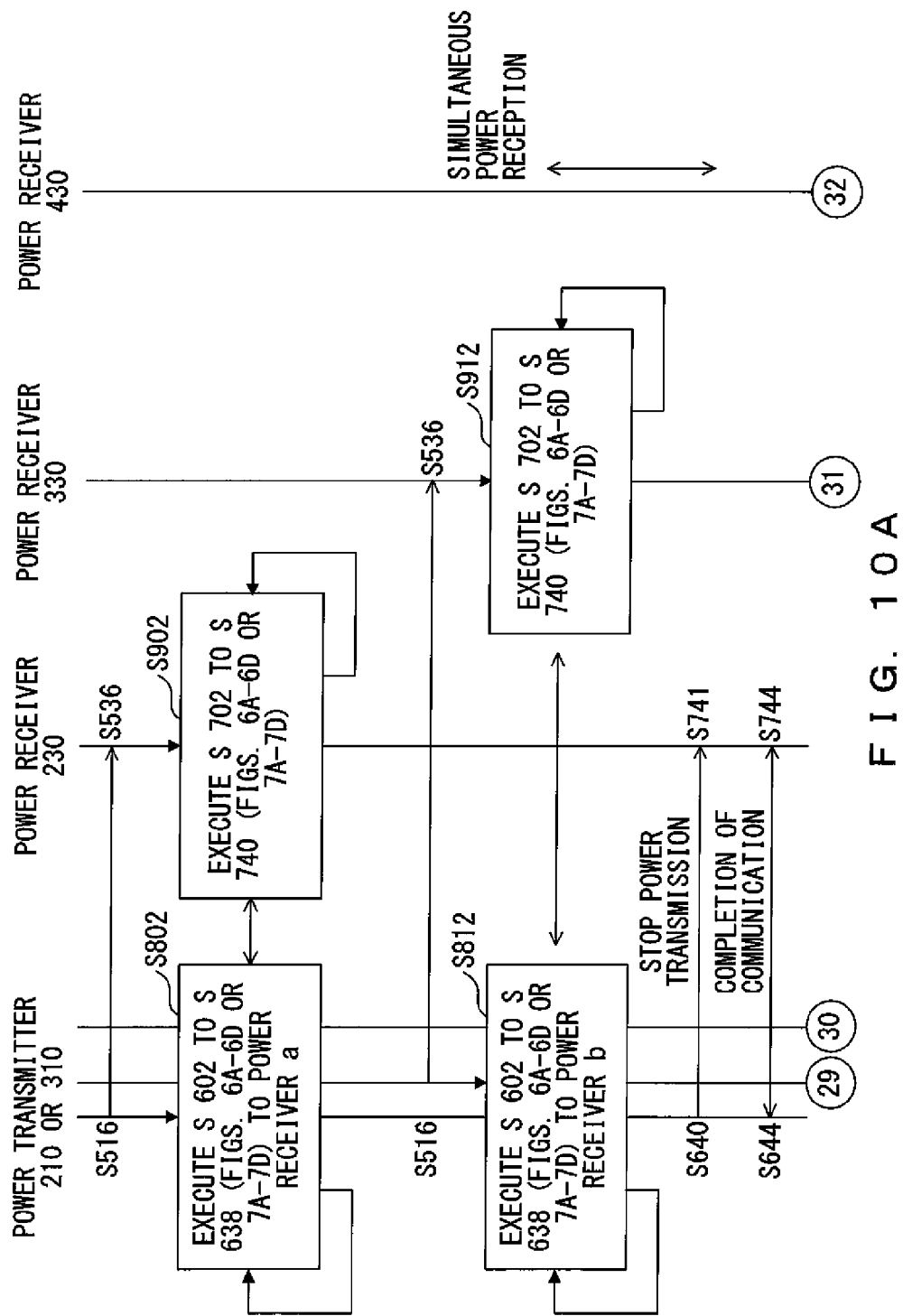
FIGS. 10A and 10B illustrate one example of a power transmission procedure when transmitting power to any of the power receivers which simultaneously receives power from one power transmitter, in accordance with the procedures of FIGS. 6A-6D or FIGS. 7A-7D, in FIG. 1A-1B or 2A-2B.
Figure 10B:
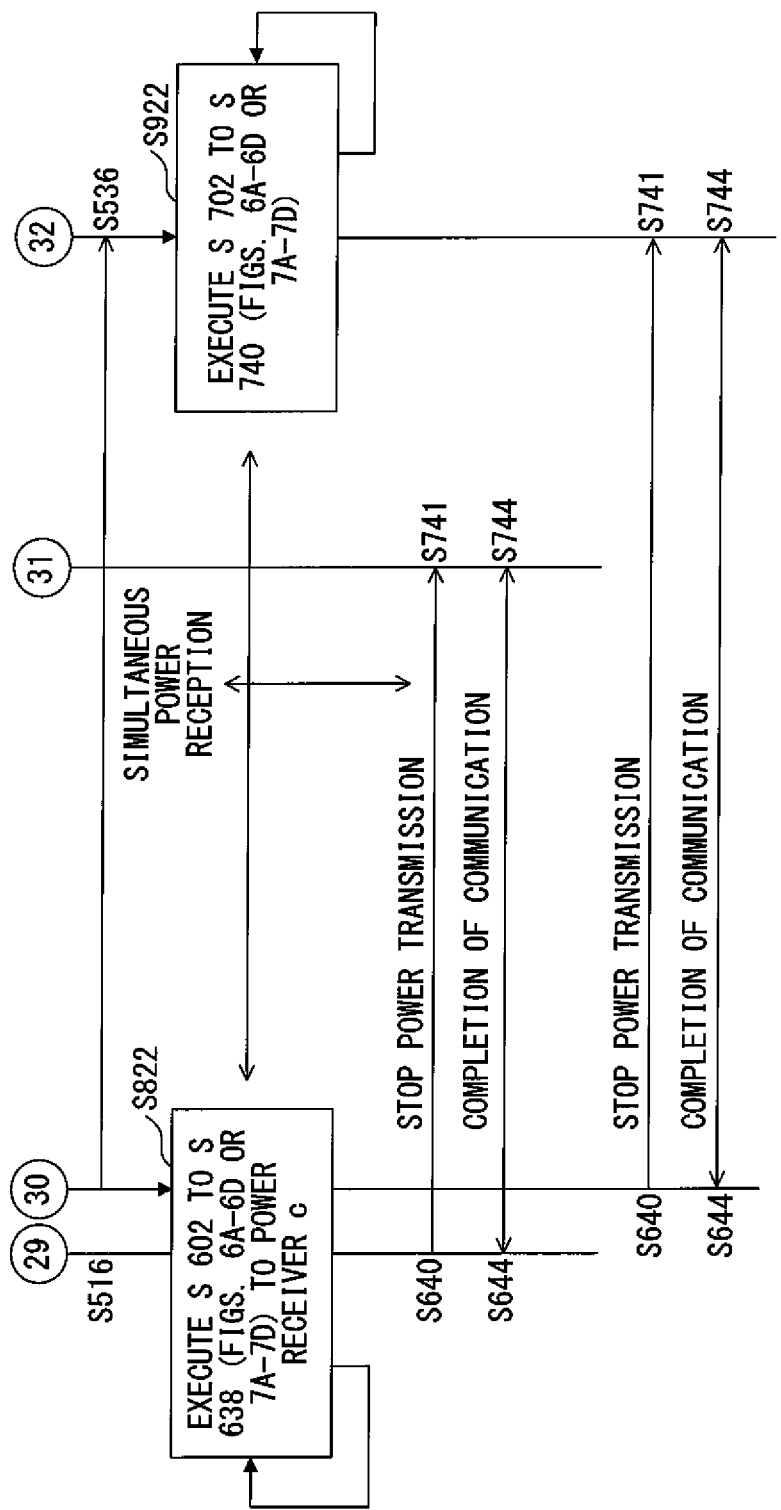

FIGS. 10A and 10B illustrate an example of the power transmission procedure when power is transmitted to any of the power receivers 230, 330, and 430 which perform simultaneous power reception from one power transmitter 210 or 310 according to the processing procedure of FIGS. 6A-6D or FIG. 7A-7B or 7C-7D in FIG. 1A-1B or 2A-2B. For purposes of explanation, it is assumed that the power transmission and power reception are performed between the power transmitter 210 and the power receivers 230, 330, and 430.

The power transmitter 210 executes step 516 of FIG. 5A at a first thread, and transmits the inquiry signals. The power receiver 230, in step 536 (FIG. 5A), receives the inquiry signals from the power transmitter 210. After that, the power transmitter 210 executes step 802, that is, the processing of steps 602 to 638 (FIGS. 6A-6D or FIGS. 7A-7D) at a first thread, and during that period, the power receiver 230 executes step 902, that is, the processing of steps 702 to 740 (FIGS. 6A-6D or FIGS. 7A-7D).

The power transmitter 210 executes step 516 (FIG. 5A) at a second thread during the period when it transmits power to the power receiver 230 at a first thread, and transmits the inquiry signals. The power receiver 330, in step 536 (FIG. 5A), receives the inquiry signals from the power transmitter 310. After that, the power transmitter 210 executes step 812, that is, the processing of steps 602 to 638 (FIGS. 6A-6D or FIGS. 7A-7D) at a second thread, and during that period, the power receiver 330 executes step 912, that is, the processing of steps 702 to 740 (FIGS. 6A-6D or FIGS. 7A-7D). Therefore, the power transmitter 210 transmits power to the power receiver 330 at a second thread during the period when it transmits power to the power receiver 230 at a first thread.

After that, the power transmitter 210 executes step 640 (FIG. 6D or 7D) at a first thread, and transmits information which indicates the stopping of the power transmission to the power receiver 230. In step 741 (FIG. 6D or 7D), the power receiver 230 completes the power reception in response to the reception of the information which indicates the stopping of the power transmission. In step 644 (FIG. 6D or 7D), the power transmitter 210 completes the wireless communication with the power receiver 230 at a first thread. In step 744 (FIG. 6D or 7D), the power receiver 230 completes the wireless communication with the power transmitter 210.

The power transmitter 210 executes step 516 of FIG. 5A at a third thread during the period when it transmits power to the power receiver 330 at a second thread, and transmits the inquiry signals. The power receiver 430, in step 536, receives the inquiry signals from the power transmitter 310. After that, the power transmitter 210 executes step 822, that is, the processing of steps 602 to 638 (FIGS. 6A-6D or FIGS. 7A-7D) at a third thread, and during that period, the power receiver 430 executes step 922, that is, the processing of steps 702 to 740 (FIGS. 6A-6D or FIGS. 7A-7D). Therefore, the power transmitter 210 transmits power to the power receiver 430 at a third thread during the period when it transmits power to the power receiver 230 at a second thread.

Figure 7D:
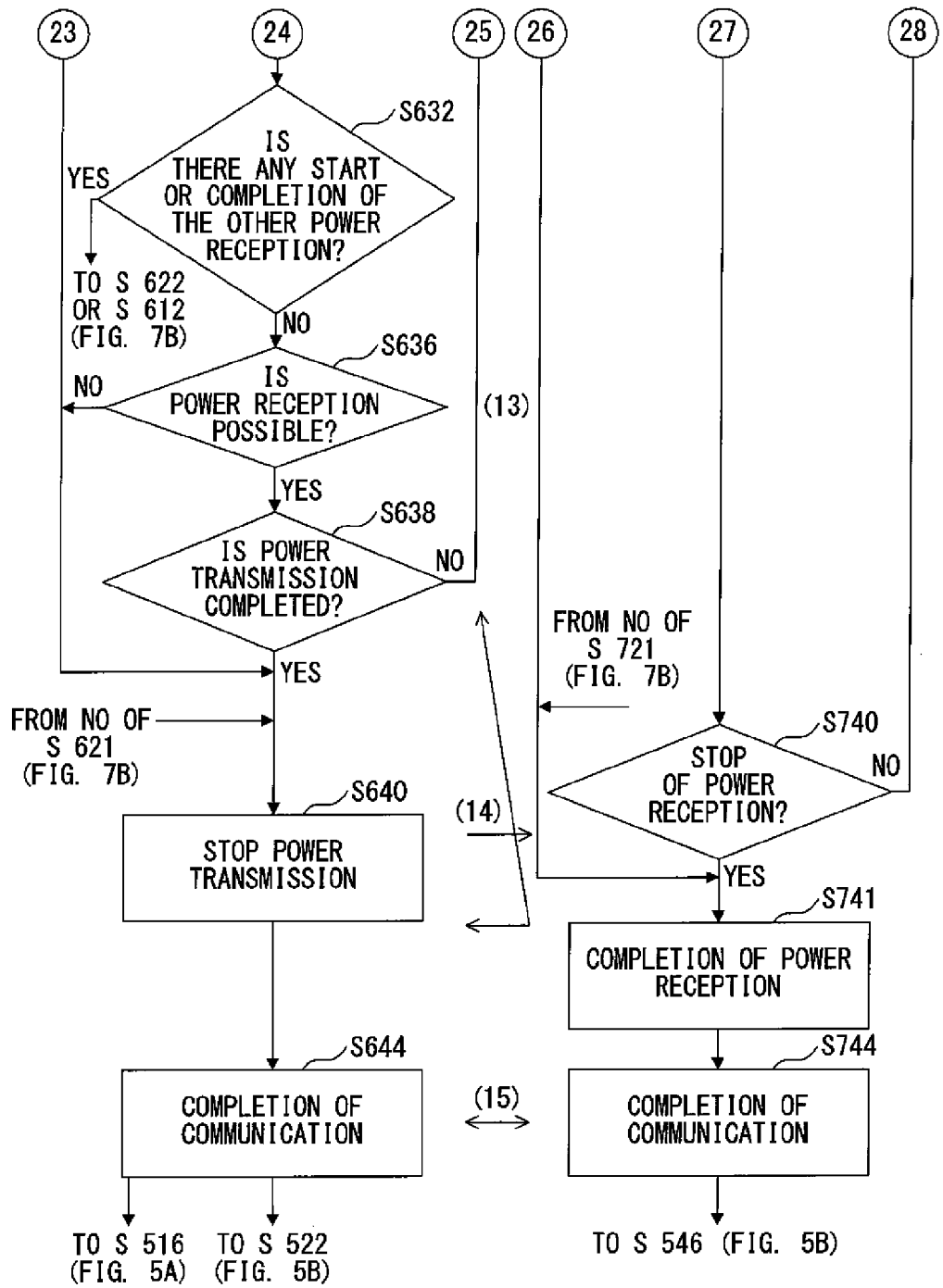

After that, the power transmitter 210 executes step 640 of FIG. 6D or 7D at a second thread, and transmits information which indicates the stopping of the power transmission to the power receiver 330. In step 741 (FIG. 6D or 7D), the power receiver 330 completes the power reception in response to reception of the information which indicates the stopping of the power transmission. In step 644 (FIG. 6D or 7D), the power transmitter 210 completes the wireless communication with the power receiver 330 at a second thread. In step 744 (FIG. 6D or 7D), the power receiver 330 completes the wireless communication with the power transmitter 210.

After that, the power transmitter 210 executes step 640 (FIG. 6D or 7D) at a third thread, and transmits information which indicates the stopping of the power transmission to the power receiver 430. In step 741 (FIG. 6D or 7D), the power receiver 430 completes the power reception in response to the reception of the information which indicates the stopping of the power transmission. In step 644 (FIG. 6D or 7D), the power transmitter 210 completes the wireless communication with the power receiver 430 at a third thread. In step 744 (FIG. 6D or 7D), the power receiver 430 completes the wireless communication with the power transmitter 210.

Figure 11B:
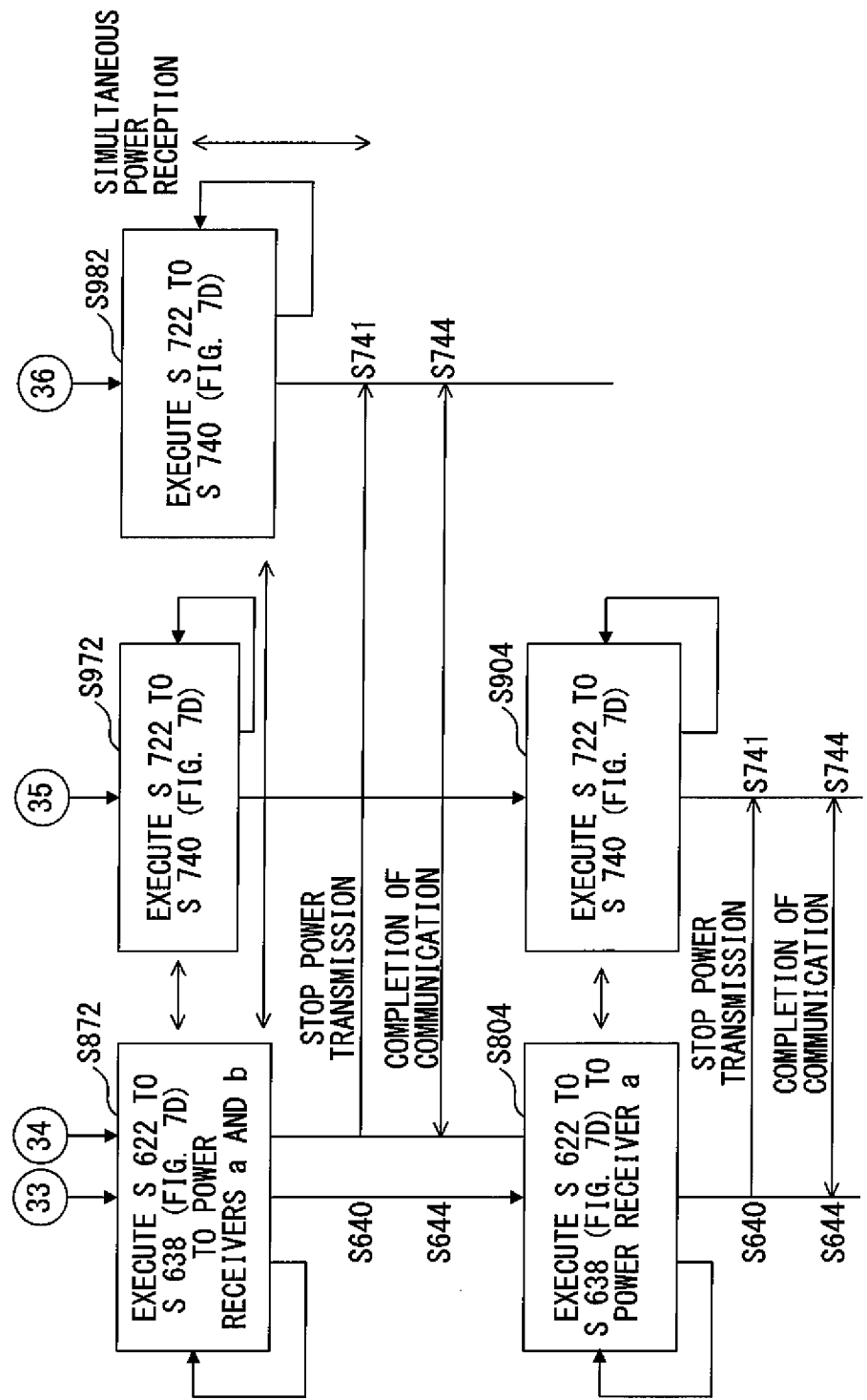

FIGS. 11A and 11B illustrates, in FIG. 1A-1B or 2A-2B, another example of a power transmission procedure when transmitting power to the two power receivers 230 and 330 which receive power simultaneously from one power transmitter 210 or 310 in accordance with the processing procedure of FIGS. 7A-7D. For purposes of explanation, it is assumed that the power transmission and power reception are performed between the power transmitter 210 and the power receivers 230 and 330.

The power transmitter 210 executes step 516 of FIG. 5A at a first thread and transmits the inquiry signals. The power receiver 230, in step 536, receives the inquiry signals from the power transmitter 210. After that, the power transmitter 210 executes step 802, that is, the processing of steps 602 to 638 (FIGS. 7A-7D) at a first thread, and during that period, the power receiver 230 executes step 902, that is, the processing of steps 702 to 740 (FIGS. 7A-7D).

After that, the power transmitter 210 executes step 516 (FIG. 5A) at a second thread during the period when it transmits power to the power receiver 230 at a first thread, and transmits the inquiry signals. The power receiver 330, in step 536, receives the inquiry signals from the power transmitter 310. After that, the power transmitter 210 executes step 862, that is, the processing of authentication and the wireless communication establishment of steps 602 to 610 (FIGS. 7A and 7B) at a second thread, and during that period, the power receiver 330 executes step 962, that is, the processing of the wireless communication establishment of step 702 (FIG. 7A).

The power transmitter 210 executes step 612 (FIG. 7B) at a second thread during the period when it transmits power to the power receiver 230 at a first thread, and transmits information which indicates that the simultaneous power reception has been started, to the power receiver 230. In step 712 (FIG. 7B), the power receiver 330 receives the information which indicates the starting-up of the simultaneous power reception by the power transmitter 210.

After that, the power transmitter 210 executes step 620 (FIG. 7B) at a second thread, transmits the power transmitting condition to the power receiver 330, and receives the power receiving condition from the power receiver 330. The power receiver 330 executes step 720, transmits the power receiving condition to the power transmitter 210, and receives the power transmitting condition from the power transmitter 210.

The power transmitter 210 executes step 622 (FIG. 7B) of step 872 at first and second threads, transmits information which indicates to temporarily transmit power to the power receiver 230, and transmits power temporarily or transiently via the power transmitting resonant coil 226. In step 722 of steps 972 and 982 (FIG. 7B), each of the power receivers 230 and 330 receives information which indicates that the temporary power transmission is performed from the power transmitter 210, fetches the power via the power receiving resonant coil 246, and temporarily or transiently receives power.

The power transmitter 210 executes step 624 (FIG. 7C) of step 872 at first and second threads, transmits information of the power transmission state to the power receivers 230 and 330, and receives information of the power reception state from the power receivers 230 and 330. In step 724 (FIG. 7C) of steps 972 and 982, each of the power receivers 230 and 330 transmits information of the power reception state to the power transmitter 210 and receives information of the power transmission state from the power transmitter 210.

After that, the power transmitter 210 repeatedly executes step 872, that is, the processing of power transmission and authentication of steps 622 to 638 (FIGS. 7C and 7D) at first and second threads, and during that period, the power receivers 230 and 330 repeatedly execute steps 972 and 982, that is, the processing of the power reception of steps 722 to 740 (FIGS. 7C and 7D).

Accordingly, the power transmitter 210 transmits power to the power receiver 330 at a second thread during the time when it transmits power to the power receiver 230 at a first thread.

After that, the power transmitter 210 executes step 640 (FIG. 7D) at a second thread, and transmits information which indicates the stopping of the power transmission to the power receiver 330. In step 741 (FIG. 7D), the power receiver 330 completes the power reception in response to the reception of the information which indicates the stopping of the power transmission. In step 644 (FIG. 7D), the power transmitter 210 completes the wireless communication with the power receiver 330 at a second thread. In step 744 (FIG. 7D), the power receiver 330 completes the wireless communication with the power transmitter 210.

After that, the power transmitter 210 executes step 804, that is, the processing of power transmission and authentication of steps 622 to 638 (FIGS. 7C and 7D) at a first thread, and during that period, the power receiver 230 executes step 904, that is, the processing of the power reception of steps 722 to 740 (FIGS. 7C and 7D). In steps 622 and 722 (FIGS. 7C and 7D), the power transmitter 210 and the power receiver 230 perform temporary power transmission and temporary power reception again.

After that, the power transmitter 210 executes step 640 (FIG. 7D) at a first thread, and transmits information which indicates the stopping of power transmission to the power receiver 230. In step 741 (FIG. 7D), the power receiver 230 completes the power reception in response to the reception of the information which indicates the stopping of the power transmission. In step 644 (FIG. 7D), the power transmitter 210 completes the communication with the power receiver 230 at a first thread. In step 744 (FIG. 7D), the power receiver 230 completes the communication with the power transmitter 210.

Figure 12A:
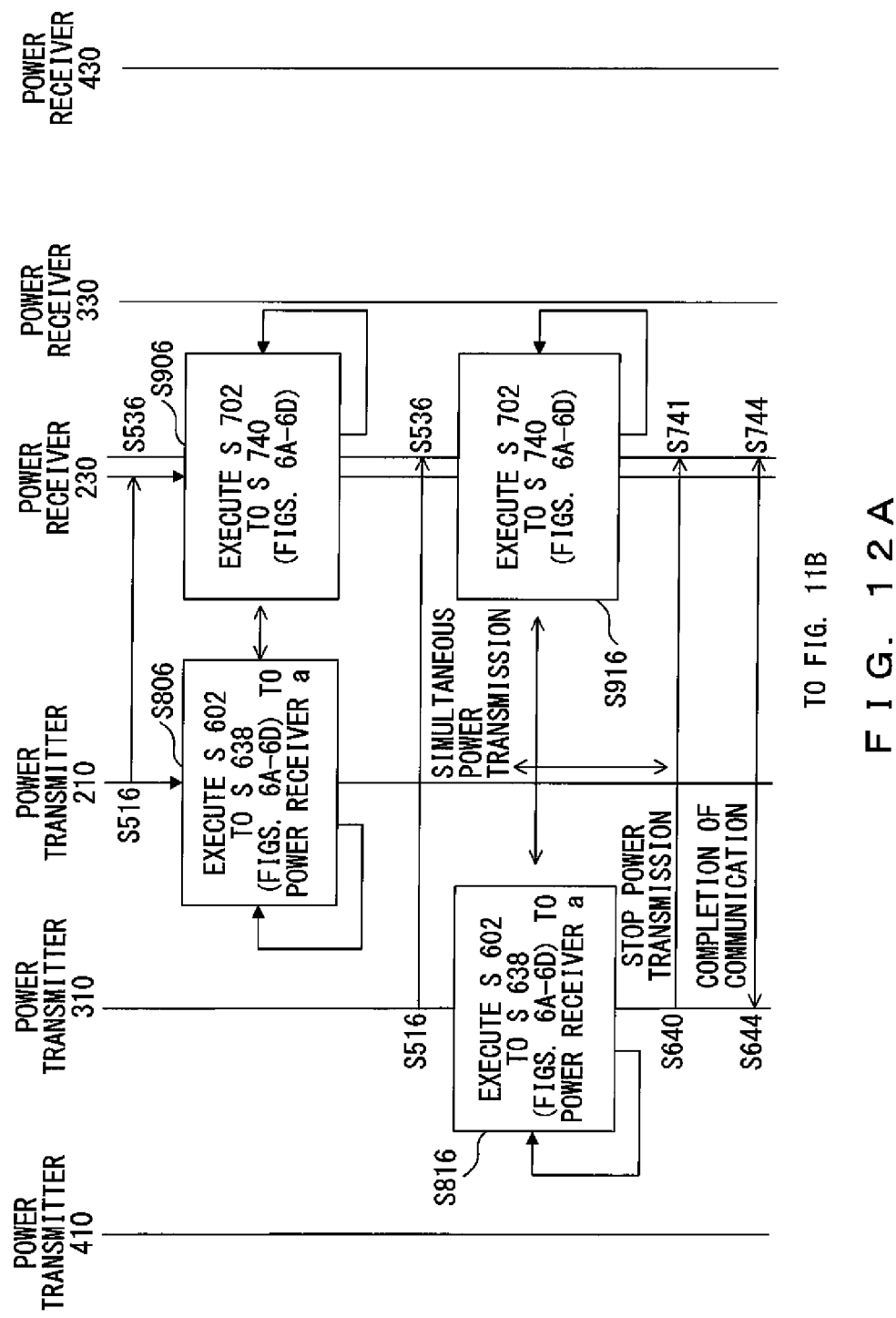
FIGS. 12A-12C respectively illustrate another example of a power transmission procedure when transmitting simultaneously power to any of the power receivers from one or two out of the plurality of power transmitters, in accordance with the procedures of FIGS. 6A-6D, in FIG. 2A-2B.
Figure 12B:
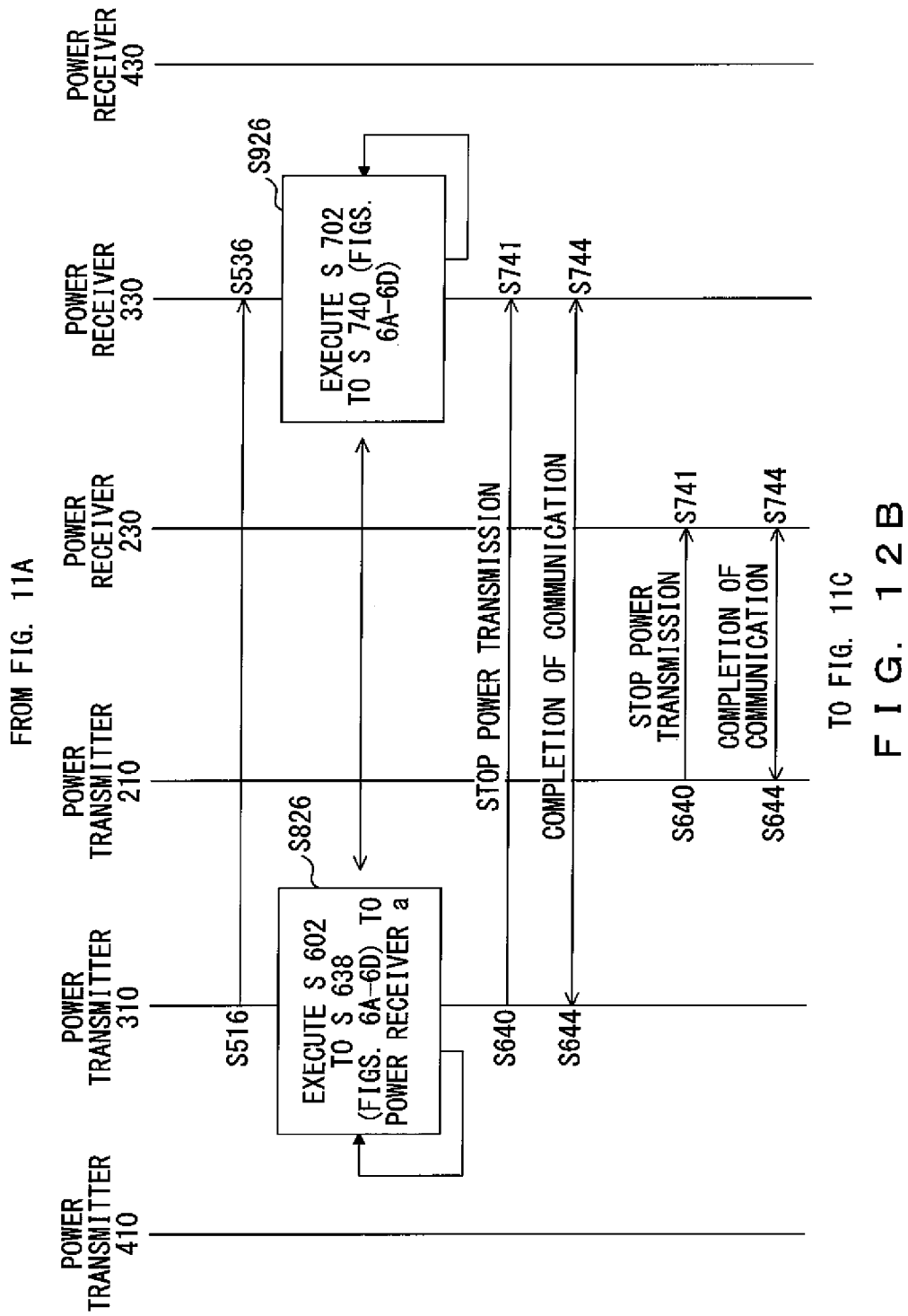
Figure 12C:
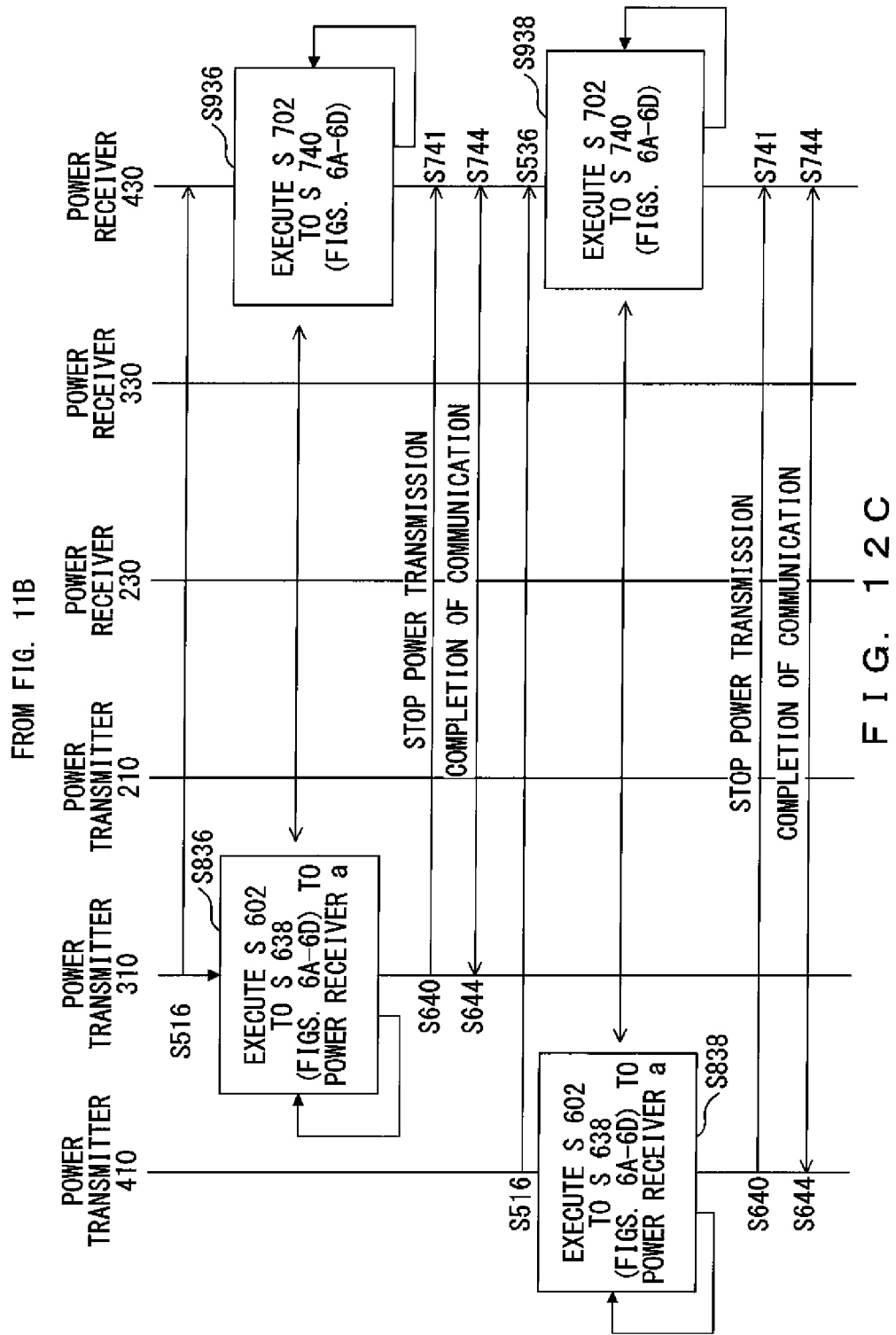

FIGS. 12A to 12C respectively illustrate another example of a power transmission procedure when transmitting power to any of the power receivers 230, 330, and 430 from the one or two power transmitters out of the plurality of the power transmitters 210, 310, and 410 according to the processing procedure of FIG. 6A, 6B, 6C or 6D in FIGS. 2A and 2B. In FIG. 12A, the two power transmitters 210 and 310 transmit power simultaneously to one power receiver 230.

In reference to FIG. 12A, the power transmitter 210 executes step 516 of FIG. 5A and transmits the inquiry signals. The power receiver 230 executes step 536 at a first thread, and receives the inquiry signals from the power transmitter 210. After that, the power transmitter 210 executes step 806, that is, the processing of steps 602 to 638 (FIGS. 6A-6D), and during that period, the power receiver 230 executes step 906, that is, the processing of steps 702 to 740 (FIGS. 6A-6D).

When the power receiver 230 receives power from the power transmitter 210 at a first thread, the other power transmitter 310 executes step 516 of FIG. 5A and transmits the inquiry signals. The power receiver 230 executes step 536 at a second thread, and receives the inquiry signals from the power transmitter 310. After that, the power transmitter 310 executes step 816, that is, the processing of steps 602 to 638 (FIGS. 6A-6D), and during that period, the power receiver 330 executes step 916, that is, the processing of steps 702 to 740 (FIGS. 6A-6D) at a second thread. With this, simultaneous power transmission from the two power transmitters 210 and 310 to the power receiver 230 is performed.

At a second thread, in step 720 of step 916 (FIG. 6B), the power receiver 230 transmits a power receiving condition which includes information indicating that the power reception is currently being performed from the other power transmitter 210 and the current power receiving resonant frequency fr to the power transmitter 310. The power transmitter 310, in step 621 of step 816, judges whether or not the power transmitting condition and the current power receiving condition fit together or conform. The power receiver 210, at a second thread, executes step 721 (FIG. 6B) and judges whether or not the power transmitting condition and the current power receiving condition fit together or conform.

The power transmitter 310, in step 626 of step 816 (FIG. 6C), judges whether or not the power transmission state of the power transmitter 310 and the power reception state of the power receiver 230 are normal. The power receiver 230, at a second thread, in step 726 of step 916 (FIG. 6C), judges whether or not the power transmission state of the power transmitter 310 and the power reception state of the power receiver 230 are normal. For example, when the power transmission efficiency k is lower than the threshold value $k_{th}$ due to inconsistent phases of the coupling magnetic field of the two power transmitters 210 and 310, it is judged as abnormal, and the power transmission (simultaneous power transmission) from the power transmitter 310 to the power receiver 210 is stopped (FIG. 6D, steps 640 and 741).

In FIG. 12A, in the power transmitters 210 and 310 as well as the power receiver 230, it is assumed that the power transmitting condition and the power receiving condition are judged to fit together in steps 621 and 721 (FIG. 6B), and that the temporary power transmission and the temporary power reception are judged to be normal in steps 626 and 726 (FIG. 6C). In this case, the simultaneous power transmission in step 628 (FIG. 6C) and the power reception in step 728 (FIG. 6C) are started and continued.

After that, when the power transmission efficiency kt or the power reception efficiency kr falls, due to the change in the power transmission and power reception environment, due to the change in the power transmission and power reception environment caused, for example, by the operation of the power receiver 230, or due to, for example, the power receiver 430 entering into the power transmissible range of the power transmitter 310, it is judged that the power reception is impossible or that the power reception is stopped (steps 636, 638, and 740).

Therefore, the power transmitter 310, in step 640 (FIG. 6D), transmits information which indicates the stopping of the power transmission to the power receiver 230. The power receiver 230, in step 741 (FIG. 6D), at a second thread, responds to the reception of information which indicates the stopping of the power transmission and completes the power reception. In step 644 (FIG. 6D), the power transmitter 310 completes the communication with the power receiver 230. In step 744 (FIG. 6D), the power receiver 230 completes the communication with the power transmitter 310. After that, the power transmission from the power transmitter 210 to the power receiver 230 is continued.

In reference to FIG. 12B, subsequently, the power transmitter 310 executes step 516 (FIG. 5A) and transmits the inquiry signals. The power receiver 330, in step 536 (FIG.

5A), receives the inquiry signals from the power transmitter 310. Subsequently, the power transmitter 310 executes step 826, that is, the processing of steps 602 to 638 (FIGS. 6A-6D), and during that time, the power receiver 330 executes step 926, that is, the processing of steps 702 to 740 (FIGS. 6A-6D).

Subsequently, the power transmitter 310, in step 640 (FIG. 6D), transmits information which indicates the stopping of the power transmission to the power receiver 330. In step 741 (FIG. 6D), the power receiver 330 responds to the reception of information which indicates the stopping of the power transmission, and completes the power reception.

In step 644 (FIG. 6D), the power transmitter 310 completes the communication with the power receiver 330. In step 744 (FIG. 6D), the power receiver 330 completes the communication with the power transmitter 310.

Subsequently, the power transmitter 210, in step 640 (FIG. 6D), transmits information which indicates the stopping of the power transmission to the power receiver 230. The power receiver 230, in step 741 (FIG. 6D), responds to the reception of information which indicates the stopping of the power transmission, and completes the power reception. In step 644 (FIG. 6D), the power transmitter 210 completes the communication with the power receiver 230. In step 744 (FIG. 6D), the power receiver 230 completes the communication with the power transmitter 210.

In reference to FIG. 12C, the power transmitter 310 executes step 516 (FIG. 5A) and transmits the inquiry signals. The power receiver 430, in step 536 (FIG. 5A), receives the inquiry signals from the power transmitter 310. Subsequently, the power transmitter 310 executes step 836, that is, the processing of steps 602 to 638 (FIGS. 6A-6D), and during that time, the power receiver 430 executes step 936, that is, the processing of steps 702 to 740 (FIGS. 6A-6D).

After that, when the power transmission efficiency k falls due to, for example, a change in the power transmission and power reception environment, the power transmitter 310, in step 640 (FIG. 6D), transmits information which indicates the stopping of the power transmission to the power receiver 430. The power receiver 430, in step 741 (FIG. 6D), responds to the reception of information which indicates the stopping of the power transmission and completes the power reception. In step 644 (FIG. 6D), the power transmitter 310 completes the communication with the power receiver 430. In step 744 (FIG. 6D), the power receiver 430 completes the communication with the power transmitter 310.

Subsequently, the power transmitter 410 executes step 516 (FIG. 5A) and transmits the inquiry signals. The power receiver 430, in step 536 (FIG. 5A), receives the inquiry signals from the power transmitter 410. Subsequently, the power transmitter 410 executes step 838, that is, the processing of steps 602 to 638 (FIGS. 6A-6D), and during that time, the power receiver 430 executes step 938, that is, the processing of steps 702 to 740 (FIGS. 6A-6D).

Subsequently, the power transmitter 410, in step 640 (FIG. 6D), transmits information which indicates the stopping of the power transmission to the power receiver 430. In step 741 (FIG. 6D), the power receiver 430 responds to the reception of the information which indicates the stopping of the power transmission, and completes the power reception.

In step 644 (FIG. 6D), the power transmitter 410 completes the communication with the power receiver 430. In step 744 (FIG. 6D), the power receiver 430 completes the communication with the power transmitter 410.

In FIGS. 12A to 12C, in combinations of FIGS. 10A and 10B, or FIGS. 11A and 11B, each of the plurality of the power transmitters 210, 310, and 410 may simultaneously transmit power to a plurality of the power receivers 230, 330, and 430 and each of the plurality of the power receivers 230, 330, and 430 may simultaneously receive power from the plurality of the transmitters 210, 310, and 410.

As mentioned above, according to the embodiments, on the basis of the respective power transmitting conditions and power receiving conditions, the power may be transmitted from any one or more of the power transmitters to any one or more of the power receivers, and for the power reception amount in respective power receivers, the power fees may be calculated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it is to be understood that the various changes, substitutions, and alterations could be made hereto without departing from the spirit and scope of the invention.

What is claimed is:
1. A power supply system comprising:
at least one power transmitter that transmits first identification information and a power transmitting condition to a power receiver, receives second identification information and a power receiving condition from the power receiver, wirelessly transmits power to the power receiver on the basis of the power transmitting condition and the power receiving condition, and generates power transmission amount information including power transmission amount indicating a power amount wirelessly transmitted to the power receiver;
at least one power receiver that receives the first identification information and the power transmitting condition from the at least one power transmitter, transmits the second identification information and the power receiving condition to the at least one power transmitter, wirelessly receives power from the at least one power transmitter on the basis of the power transmitting condition and the power receiving condition, generates power reception amount information including power reception amount indicating a power amount wirelessly received from the at least one power transmitter, and transmits the first identification information, the second identification information, and the power reception amount information via a network; and
an information processing device that manages the power transmission amount information and the power reception amount information by a wireless power feed of a contractor, the information processing device calculating the charging fee of the power supplied from the at least one power transmitter to the at least one power receiver on the basis of both the power transmission amount included in the power transmission amount information generated in the at least one power transmitter and the power reception amount included in the power reception amount information generated in the at least one power receiver, wherein
the information processing device obtains, as a power loss amount, a difference between the power transmission amount included in the power transmission amount information and the power reception amount included in the power reception amount information, and incorpo- rates a fee corresponding to the power loss amount into the charging fee at a predetermined rate.

2. The power supply system according to claim 1, wherein:
the at least one power transmitter temporarily transmits power sequentially and wirelessly to the at least one power receiver with different resonant frequencies when the power transmitting condition and the power receiving condition of the at least one power receiver fit together;
the at least one power transmitter receives information indicating a power reception state which includes a received power in the different resonant frequencies from the at least one power receiver, generates a transmitted power in the different resonant frequencies in the at least one power transmitter, determines power transmission efficiency in the different resonant frequencies on the basis of the transmitted power and the received power in the different resonant frequencies, determines one resonant frequency of the different resonant frequencies on the basis of the power transmission efficiency, transmits information indicating the determined one resonant frequency to the at least one power receiver, wirelessly transmits power to the at least one power receiver with the determined one resonant frequency; and
the at least one power receiver receives information indicating the determined one resonant frequency, and receives power with the determined one resonant frequency from the at least one power transmitter.

3. The power supply system according to claim 1, wherein:
the at least one power receiver is a plurality of power receivers;
the at least one power transmitter temporarily transmits power sequentially and wirelessly to the plurality of the power receivers which simultaneously receive power with different resonant frequencies when the power transmitting condition and the respective power receiving conditions of the plurality of the power receivers fit together;
the at least one power transmitter receives information indicating the power receiving condition which includes the received power in the different resonant frequencies from the plurality of the power receivers in the temporary power transmission, generates the transmitted power in the different resonant frequencies in the at least one power transmitter, determines the power transmission efficiency in the different resonant frequencies on the basis of the transmitted power and the received power in the different resonant frequencies, determines one resonant frequency of the different resonant frequencies on the basis of the power transmission efficiency, transmits information indicating the determined one resonant frequency to the plurality of the power receivers, transmits power to the plurality of the power receivers with the determined one resonant frequency; and
the plurality of the power receivers receives information indicating the determined one resonant frequency, and simultaneously receives power with the determined one resonant frequency from the at least one power transmitter.

4. The power supply system according to claim 1, wherein:
the at least one power receiver is a plurality of power receivers;
the at least one power transmitter temporarily transmits power with different resonant frequencies sequentially and wirelessly to the plurality of the receivers which simultaneously receive power when the power transmitting condition and the respective power receiving conditions of the plurality of the power receivers fit together;
the at least one power transmitter receives information indicating a power reception state which includes a received power in the different resonant frequencies from the plurality of power receivers in the temporary power transmission, generates a transmitted power in the different resonant frequencies in the at least one power transmitter, determines a set of power transmission efficiencies in the different resonant frequencies on the basis of the transmitted power and the received power in the different resonant frequencies, and completes the power reception by some of the plurality of power receivers with a low priority when the set of power transmission efficiencies is not greater than a threshold value, temporarily transmits power again with different resonant frequencies sequentially and wirelessly to the other power receiver of the plurality of power receivers which simultaneously receive power, determines one resonant frequency of the different resonant frequencies by which a power transmission efficiency higher than the threshold value is obtained, determines one resonant frequency of the different resonant frequencies on the basis of the high power transmission efficiency, transmits information indicating the determined one resonant frequency to the other power receiver, transmits power to the other power receiver with the determined one resonant frequency; and
the other power receiver receives information indicating the determined one resonant frequency, and simultaneously receives power with the determined one resonant frequency from the at least one power transmitter.

5. The power supply system according to claim 1, wherein:
the at least one power transmitter is a plurality of power transmitters;
the plurality of power transmitters wirelessly and temporarily transmits power to the at least one power receiver when the power transmitting condition of the plurality of power transmitters and the power receiving condition of the at least one power receiver fit together;
the at least one power receiver receives information indicating the power transmitting condition which includes the transmitted power from the plurality of the power transmitters in the temporary power transmission, generates the received power in the at least one power receiver, determines the power reception efficiency on the basis of the transmitted power and the received power, transmits information indicating a continuation or start of the power reception to the plurality of the power transmitters when the power reception efficiency is higher than a threshold value, and simultaneously receives power from a plurality of power receivers.

6. The power supply system according to claim 5, wherein the information processing device, on the basis of the power transmission amount information of the at least one power transmitter and the power reception amount information of the plurality of power receivers, calculates a fee with respect to a value of a ratio covered by each contractor between a power amount of the power transmission amount information and a power amount of the plurality of pieces of power reception amount information as each of fees with respect to each piece of the power reception amount information of the plurality of power receivers.

7. The power supply system according to claim 1, wherein the power transmitter comprises:

a transmission and reception unit that transmits the first identification information and the power transmitting condition to the first and second power receivers as the at least one power receiver, and receives the second identification information and third identification information, the first and the second power receiving conditions as the power receiving condition, and the first and the second received power information, respectively, from the first and second power receivers;

a power transmitting unit that includes a power transmitting resonant coil and a power supplying unit supplying power of an induced current to the power transmitting resonant coil; and a controlling unit that controls the power transmitting unit in such a way as to wirelessly transmit power to the first and the second power receivers on the basis of the power transmitting condition and the first and the second power receiving conditions when the power transmitting condition and the first and the second power receiving conditions fit together, generates the transmitted power information of the power transmitting unit and the power transmission amount information, controls power transmission to the second power receiver on the basis of the transmitted power information and the first and the second power reception amount information, and supplies the first identification information, the second identification information, the third identification information, and the power transmission amount information to a communication device.

8. The power supply system according to claim 1, wherein the power receiver comprises:
a first transmitting and receiving unit that receives the first identification information and third identification information, the first and the second power transmitting conditions, and first and second transmitted power information respectively from the first and the second power transmitters as the at least one power transmitter, and transmits the second identification information and the power receiving condition to the first and the second power transmitters;

a power receiving unit that has a power receiving resonant coil and a power fetching unit fetching power of an induced current of the power receiving resonant coil and wirelessly receives power from the first and the second power transmitters via the power receiving resonant coil;

a controlling unit that controls the power receiving unit in such a way as to wirelessly receive power from the first and the second power transmitters on the basis of the first and the second power transmitting conditions and the power receiving condition when the first and the second power transmitting conditions and the power receiving condition fit together, generates the received power information of the power receiving unit and the power reception amount information, and controls power reception from the second power transmitter on the basis of the first and the second transmitted power information and the received power information; and a second transmitting and receiving unit that transmits the second identification information and the power reception amount information via a network.

9. The power supply system according to claim 1, further comprising at least one communication device that transmits second identification information and power transmission amount information via a network.

10. A power transmitter comprising:
a transmitting and receiving unit that transmits first identification information and a power transmitting condition to first and second power receivers, and receives second and a third identification information, first and a second power receiving conditions, and first and a second received power information respectively from the first and the second power receivers;

a power transmitting unit that includes a power transmitting resonant coil and a power supplying unit supplying power of an induced current to the power transmitting resonant coil;

a controlling unit that controls the power transmitting unit in such a way as to wirelessly transmit power to the first and the second power receivers on the basis of the power transmitting condition and the first and the second power receiving conditions, when the power transmitting condition and the first and the second power receiving conditions fit together, generates the transmitted power information of the power transmitting unit and a power transmission amount information including power transmission amount indicating the wirelessly transmitted power amount, controls power transmission to the second power receiver on the basis of the transmitted power information and the first and the second received power information, and supplies the first identification information, the second identification information, the third identification information, and the power transmission amount information to a communication device, and the communication device that transmits the first identification information, the second identification information, the third identification information, and the power transmission amount information to an information processing device, wherein the second power receiver receives the first identification information and the power transmitting condition from the power transmitter, generates power reception amount information including power reception amount indicating a power amount wirelessly received from the power transmitter, and transmits the first identification information, the third identification information, and the power reception amount information to the information processing device; and the information processing device calculates the charging fee of the power supplied from the power transmitter to the second power receiver on the basis of both the power transmission amount included in the power transmission amount information generated in the power transmitter and the power reception amount included in the power reception amount information generated in the second power receiver, the information processing device obtains, as a power loss amount, a difference between the power transmission amount included in the power transmission amount information and the power reception amount included in the power reception amount information, and incorporates a fee corresponding to the power loss amount into the charging fee at a predetermined rate.

11. A power receiver comprising:
a first transmitting and receiving unit that receives first and second identification information, first and second power transmitting conditions, and first and second transmitted power information respectively from first and second power transmitters, and transmits third identification information and a power receiving condition to the first and second power transmitters;

a power receiving unit that has a power receiving resonant coil and a power fetching unit fetching power of an induced current of the power receiving resonant coil and wirelessly receives power from the first and second power transmitters via the power receiving resonant coil;

a controlling unit that controls the power receiving unit in such a way as to wirelessly receive power from the first and second power transmitters on the basis of the first and second power transmitting conditions and the power receiving condition when the first and second power transmitting conditions and the power receiving condition fit together, generates received power information of the power receiving unit and power reception amount information including power reception amount indicating the wirelessly received power amount, and controls power reception from the second power transmitter on the basis of the first and second transmitted power information and the received power information; and a second transmitting and receiving unit that transmits the third identification information and the power reception amount information to an information processing device, wherein the second power transmitter generates a power transmission amount information including power transmission amount indicating the wirelessly transmitted power amount from the second power transmitter to the power receiver, transmits the second identification information, the third identification information, and the power transmission amount information to the information processing device, the information processing device calculates the charging fee of the power supplied from the second power transmitter to the power receiver on the basis of both the power transmission amount included in the power transmission amount information generated in the second power transmitter and the power reception amount included in the power reception amount information generated in the power receiver, the information processing device obtains, as a power loss amount, a difference between the power transmission amount included in the power transmission amount information and the power reception amount included in the power reception amount information, and incorporates a fee corresponding to the power loss amount into the charging fee at a predetermined rate.

* * * * *